(12) United States Patent
Myers et al.

(10) Patent No.: US 12,524,123 B2
(45) Date of Patent: Jan. 13, 2026

(54) ELECTRONIC DEVICES WITH SIDEWALL DISPLAYS

(71) Applicant: Apple Inc., Cupertino, CA (US)

(72) Inventors: Scott A. Myers, Saratoga, CA (US); Stephen Brian Lynch, Portola Valley, CA (US); Anthony S. Montevirgen, Redwood City, CA (US)

(*) Notice: Subject to any disclaimer, the term of this patent is extended or adjusted under 35 U.S.C. 154(b) by 0 days.

(21) Appl. No.: 19/025,537

(22) Filed: Jan. 16, 2025

(65) Prior Publication Data

US 2025/0165109 A1    May 22, 2025

Related U.S. Application Data

(63) Continuation of application No. 18/424,003, filed on Jan. 26, 2024, now Pat. No. 12,411,583, which is a
(Continued)

(51) Int. Cl.
| | |
|---|---|
| *G06F 3/044* | (2006.01) |
| *G06F 1/16* | (2006.01) |
| *G06F 3/041* | (2006.01) |
| *G06F 3/04817* | (2022.01) |
| *G06F 3/0488* | (2022.01) |
| *G06F 3/04886* | (2022.01) |

(Continued)

(52) U.S. Cl.
CPC .......... *G06F 3/0446* (2019.05); *G06F 1/1652* (2013.01); *G06F 3/041* (2013.01); *G06F 3/0412* (2013.01); *G06F 3/04817* (2013.01); *G06F 3/0488* (2013.01); *G06F 3/04886* (2013.01); *H04M 1/0268* (2013.01); *H04M 1/0269* (2022.02); *G06F 2203/04102* (2013.01); *G06F 2203/04112* (2013.01); *H04M 1/0283* (2013.01); *H04M 1/236* (2013.01); *H04M 2250/16* (2013.01); *H04M 2250/22* (2013.01)

(58) Field of Classification Search
None
See application file for complete search history.

(56) References Cited

U.S. PATENT DOCUMENTS

| | | |
|---|---|---|
| 4,066,855 A | 1/1978 | Zenk |
| 4,085,302 A | 4/1978 | Zenk et al. |

(Continued)

FOREIGN PATENT DOCUMENTS

| | | |
|---|---|---|
| CN | 2600861 Y | 1/2004 |
| CN | 2840176 Y | 11/2006 |

(Continued)

*Primary Examiner* — Nicholas J Lee
(74) *Attorney, Agent, or Firm* — Treyz Law Group, P.C.; Kendall P. Woodruff

(57) ABSTRACT

Electronic devices may be provided that contain flexible displays that are bent to form displays on multiple surfaces of the devices. Bent flexible displays may be bent to form front side displays and edge displays. Edge displays may be separated from front side displays or from other edge displays using patterned housing members, printed or painted masks, or by selectively activating and inactivating display pixels associated with the flexible display. Edge displays may alternately function as virtual buttons, virtual switches, or informational displays that are supplemental to front side displays. Virtual buttons may include transparent button members, lenses, haptic feedback components, audio feedback components, or other components for providing feedback to a user when virtual buttons are activated.

20 Claims, 16 Drawing Sheets

Related U.S. Application Data continuation of application No. 18/304,158, filed on Apr. 20, 2023, now Pat. No. 11,928,301, which is a continuation of application No. 17/973,658, filed on Oct. 26, 2022, now Pat. No. 11,662,869, which is a continuation of application No. 17/588,072, filed on Jan. 28, 2022, now Pat. No. 11,507,239, which is a continuation of application No. 17/164,611, filed on Feb. 1, 2021, now Pat. No. 11,237,685, which is a continuation of application No. 16/720,257, filed on Dec. 19, 2019, now Pat. No. 10,936,136, which is a continuation of application No. 16/421,892, filed on May 24, 2019, now Pat. No. 10,521,034, which is a continuation of application No. 16/105,744, filed on Aug. 20, 2018, now Pat. No. 10,318,029, which is a continuation of application No. 15/783,272, filed on Oct. 13, 2017, now Pat. No. 10,055,039, which is a continuation of application No. 14/692,365, filed on Apr. 21, 2015, now Pat. No. 9,411,451, which is a continuation of application No. 14/602,199, filed on Jan. 21, 2015, now Pat. No. 9,791,949, which is a continuation of application No. 14/273,315, filed on May 8, 2014, now Pat. No. 8,976,141, which is a continuation of application No. 13/246,510, filed on Sep. 27, 2011, now Pat. No. 8,723,824.

(51) Int. Cl.
 *H04M 1/02* (2006.01)
 *H04M 1/23* (2006.01)

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,577,496 B1 | 6/2003 | Gioscia et al. |
| 6,690,387 B2 | 2/2004 | Zimmerman et al. |
| 6,803,245 B2 | 10/2004 | Auch et al. |
| 7,015,894 B2 | 3/2006 | Morohoshi |
| 7,034,913 B2 | 4/2006 | Ishida |
| 7,184,064 B2 | 2/2007 | Zimmerman et al. |
| 7,541,671 B2 | 6/2009 | Foust et al. |
| 7,663,607 B2 | 2/2010 | Hotelling et al. |
| 7,834,451 B2 | 11/2010 | Lee et al. |
| 2002/0000470 A1 | 1/2002 | Lanzaro et al. |
| 2005/0174302 A1 | 8/2005 | Ishii |
| 2006/0026521 A1 | 2/2006 | Hotelling et al. |
| 2006/0077118 A1 | 4/2006 | Huang et al. |
| 2006/0197753 A1 | 9/2006 | Hotelling |
| 2007/0063980 A1 | 3/2007 | Eich et al. |
| 2007/0085157 A1 | 4/2007 | Fadell et al. |
| 2007/0202933 A1 | 8/2007 | Tolbert et al. |
| 2008/0146285 A1 | 6/2008 | Lee et al. |
| 2008/0223708 A1 | 9/2008 | Joo |
| 2008/0227507 A1 | 9/2008 | Joo |
| 2009/0167171 A1 | 7/2009 | Jung et al. |
| 2009/0256471 A1 | 10/2009 | Kim et al. |
| 2010/0026656 A1 | 2/2010 | Hotelling et al. |
| 2010/0026952 A1 | 2/2010 | Miura et al. |
| 2010/0079264 A1 | 4/2010 | Hoellwarth |
| 2010/0079400 A1 | 4/2010 | Nissar |
| 2010/0093410 A1 | 4/2010 | Cho et al. |
| 2010/0117975 A1 | 5/2010 | Cho |
| 2010/0120473 A1 | 5/2010 | Oh |
| 2010/0123160 A1 | 5/2010 | Hatano et al. |
| 2010/0128002 A1 | 5/2010 | Stacy et al. |
| 2010/0216514 A1 | 8/2010 | Smoyer et al. |
| 2010/0315399 A1 | 12/2010 | Jacobson et al. |
| 2011/0014955 A1 | 1/2011 | Kim et al. |
| 2011/0015193 A1 | 1/2011 | Eickmeier et al. |
| 2011/0086680 A1 | 4/2011 | Kim et al. |
| 2011/0148786 A1 | 6/2011 | Day et al. |
| 2011/0151935 A1 | 6/2011 | Oksman et al. |
| 2011/0188189 A1 | 8/2011 | Park et al. |
| 2011/0261002 A1 | 10/2011 | Verthein |
| 2012/0009896 A1 | 1/2012 | Bandyopadhyay et al. |
| 2012/0027351 A1 | 2/2012 | Asselin et al. |
| 2012/0127087 A1 | 5/2012 | Ma |
| 2012/0218219 A1 | 8/2012 | Rappoport et al. |
| 2012/0242588 A1 | 9/2012 | Myers et al. |
| 2012/0242592 A1 | 9/2012 | Rothkopf et al. |
| 2012/0243151 A1 | 9/2012 | Lynch |
| 2012/0243719 A1 | 9/2012 | Franklin et al. |
| 2013/0010405 A1 | 1/2013 | Rothkopf et al. |
| 2013/0033434 A1 | 2/2013 | Richardson et al. |
| 2013/0063891 A1 | 3/2013 | Martisauskas et al. |
| 2013/0081756 A1 | 4/2013 | Franklin et al. |
| 2013/0082984 A1 | 4/2013 | Drzaic et al. |
| 2013/0083491 A1 | 4/2013 | Rappoport et al. |
| 2013/0083496 A1 | 4/2013 | Franklin et al. |
| 2013/0094126 A1 | 4/2013 | Rappoport et al. |
| 2013/0140965 A1 | 6/2013 | Franklin et al. |
| 2013/0279088 A1 | 10/2013 | Raff et al. |

FOREIGN PATENT DOCUMENTS

| | | |
|---|---|---|
| CN | 2845138 Y | 12/2006 |
| CN | 201047933 Y | 4/2008 |
| CN | 201409149 Y | 2/2010 |
| CN | 101739171 B | 6/2010 |
| CN | 102098370 A | 6/2011 |
| CN | 201947312 U | 8/2011 |
| CN | 102289344 B | 12/2011 |
| CN | 102541177 A | 7/2012 |
| EP | 1971111 B1 | 9/2008 |
| EP | 2192750 B1 | 6/2010 |
| JP | 2000163031 A5 | 6/2000 |
| JP | 2002342033 A | 11/2002 |
| JP | 2004208013 A | 7/2004 |
| JP | 2005174114 A | 6/2005 |
| JP | 2007072902 A | 3/2007 |
| JP | 2007240777 A | 9/2007 |
| JP | 2009289025 A | 12/2009 |
| JP | 2011133800 A | 7/2011 |
| KR | 10-2008-0084497 A | 9/2008 |
| KR | 20080084494 A | 9/2008 |
| KR | 20080084497 A | 9/2008 |
| KR | 20100069436 A | 6/2010 |
| TW | 201017499 A | 5/2010 |

ELECTRONIC DEVICES WITH SIDEWALL DISPLAYS

This application is a continuation of U.S. patent application Ser. No. 18/424,003, filed Jan. 26, 2024, which is a continuation of U.S. patent application Ser. No. 18/304,158, filed Apr. 20, 2023, now U.S. Pat. No. 11,928,301, which is a continuation of U.S. patent application Ser. No. 17/973,658, filed Oct. 26, 2022, now U.S. Pat. No. 11,662,869, which is a continuation of U.S. patent application Ser. No. 17/588,072, filed Jan. 28, 2022, now U.S. Pat. No. 11,507,239, which is a continuation of U.S. patent application Ser. No. 17/164,611, filed Feb. 1, 2021, now U.S. Pat. No. 11,237,685, which is a continuation of U.S. patent application Ser. No. 16/720,257, filed Dec. 19, 2019, now U.S. Pat. No. 10,936,136, which is a continuation of U.S. patent application Ser. No. 16/421,892, filed May 24, 2019, now U.S. Pat. No. 10,521,034, which is a continuation of U.S. patent application Ser. No. 16/105,744, filed Aug. 20, 2018, now U.S. Pat. No. 10,318,029, which is a continuation of U.S. patent application Ser. No. 15/783,272, filed Oct. 13, 2017, now U.S. Pat. No. 10,055,039, which is a continuation of U.S. patent application Ser. No. 14/692,365, filed Apr. 21, 2015, now U.S. Pat. No. 9,411,451, which is a continuation of U.S. patent application Ser. No. 14/602,199, filed Jan. 21, 2015, now U.S. Pat. No. 9,791,949, which is a continuation of U.S. patent application Ser. No. 14/273,315, filed May 8, 2014, now U.S. Pat. No. 8,976,141, which is a continuation of U.S. patent application Ser. No. 13/246,510, filed Sep. 27, 2011, now U.S. Pat. No. 8,723,824, all of which are hereby incorporated by reference herein in their entireties.

BACKGROUND

This relates generally to flexible displays, and more particularly, to electronic devices with flexible displays.

Electronic devices such as portable computers and cellular telephones are often provided with rigid displays made from rigid display structures. For example, a liquid crystal display (LCD) may be formed from a stack of rigid display structures such as a thin-film transistor glass layer with display pixels for providing visual feedback to a user, a color filter glass layer for providing the display pixels with color, a touch screen panel for gathering touch input from a user, and a cover glass layer for protecting the display and internal components.

Conventional devices may also have input-output components such as buttons, microphones, speakers, and other components that receive or transmit tactile input from a user mounted on edges of the device away from the display. Tactile input components are often formed from sliding or reciprocating button members and associated electrical components such as switches.

Flexible display technologies are available that allow displays to be flexed. For example, flexible displays may be formed using flexible organic light-emitting diode (OLED) display technology.

It would be desirable to be able to use flexible display technology to provide improved electronic devices such as electronic devices with input-output components.

SUMMARY

Electronic devices may be provided with flexible displays. The flexible displays may include one or more flexible layers and may be mounted under a transparent display cover layer such as a layer of clear glass or plastic. For example, a flexible display may be mounted on the underside of a cover layer. Flexible displays may include a touch-sensitive layer that allows a user to provide touch input to an electronic device. Display pixels on a flexible display may be used to display visual information to the user.

An electronic device may have a housing in which a flexible display is mounted. The housing and flexible display may be configured to form planar front and rear surfaces and sidewall surfaces for the device. A flexible display may be mounted so that at least a first portion of the flexible display is mounted on the front surface of the device and forms part of the front surface. The flexible display may have a bend that allows a second portion of the flexible display to cover some of the sidewall surfaces of the device.

The flexible display may be used for displaying information and visual feedback to a user and for accepting input from a user. Active portions of the display configured for user input and output functions may be separated from inactive portions of the display using an opaque masking layer. The opaque masking layer may be formed on an inner surface of the cover layer.

Openings may be formed in the opaque masking layer on the front and sidewall surfaces of the device. The front portion of the flexible display may be viewed through an opaque masking layer opening on the front of the device. Sidewall portions of the flexible display may be viewed through one or more sidewall openings in the opaque masking layer.

Active portions (illuminated regions of pixels) on the sidewall edges of an electronic device may be used to create virtual user interface controls such as buttons. The buttons or other user input interface elements may be reconfigured during use of the electronic device. For example, the user input interface elements on the sidewall of an electronic device may be repurposed for supporting user input operations in different operating modes of the electronic device. Virtual buttons on the edge of a device may be provided in place of tactile input/output components such as physical buttons and switches or may be formed as part of a dummy button structure or other mechanical feature.

During operation of an electronic device, a virtual button may be, for example, a virtual volume button for controlling audio output volume and may be repurposed based on user input to become a virtual camera shutter button for taking a picture or may be reconfigured to serve as a controller for another device function. Images displayed on the flexible display may indicate to a user which function is currently being performed by the virtual button. Predetermined inputs to the touch-sensitive layer on the edge of the device (e.g., tapping, sliding, swiping, or other motions of an external object such as a finger across the edge of the device) may be used to change the operating mode of the device.

Further features of the invention, its nature and various advantages will be more apparent from the accompanying drawings and the following detailed description of the preferred embodiments.

DETAILED DESCRIPTION

An electronic device may be provided that has a flexible display with bent edges. Bent edges of the flexible display may be visible along a sidewall or edge of the electronic device.

Flexible displays may be formed from flexible layers such as a flexible display layer (e.g., a flexible organic light-emitting diode array), a flexible touch-sensitive layer (e.g., a sheet of polymer with an array of transparent capacitor electrodes for a capacitive touch sensor), a flexible substrate layer, etc. These flexible layers may, if desired, be covered by a flexible or rigid cover layer (sometimes referred to as a cover glass) or may be supported by a support structure (e.g., a rigid support structure on the underside of the flexible layers).

Portions of the flexible display may be visible on multiple surfaces of an electronic device. For example, a planar portion of the display may be visible on a front or back surface of the device while an edge portion that has been bent along a sidewall of the electronic device may be visible on the edge of the device.

Portions of the flexible display that are visible from the side of the device may be used to display information and virtual buttons for output and input of information to and from a user, respectively.

Figure 1:
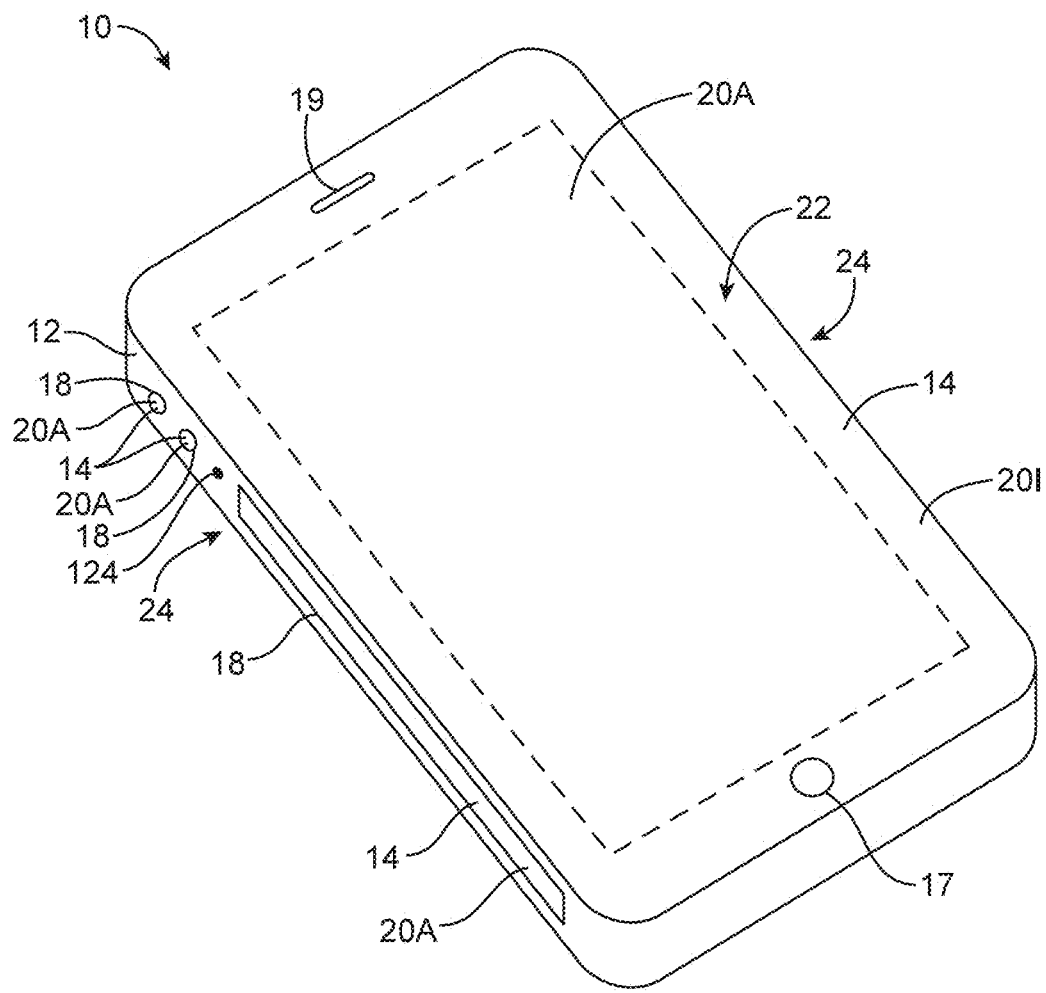
FIG. 1 is a perspective view of an illustrative electronic device with a flexible display having portions on multiple surfaces of a device in accordance with an embodiment of the present invention.

An illustrative electronic device of the type that may be provided with a flexible display having bent edges visible along an edge of the device is shown in FIG. 1. Electronic device 10 may be a portable electronic device or other suitable electronic device. For example, electronic device 10 may be a laptop computer, a tablet computer, a somewhat smaller device such as a wrist-watch device, pendant device, or other wearable or miniature device, a cellular telephone, a media player, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may have a flexible display such as flexible display 14. Flexible display 14 may be formed from multiple layers of material. These layers may include a touch sensor layer such as a layer on which a pattern of indium tin oxide (ITO) electrodes or other suitable transparent electrodes have been deposited to form a capacitive touch sensor array. These layers may also include a layer that contains an array of display pixels. The touch sensor layer and the display layer may be formed using flexible sheets of polymer or other substrates having thicknesses of 10 microns to 0.5 mm or other suitable thicknesses (as an example).

The display pixel array may be, for example, an organic light-emitting diode (OLED) array. Other types of flexible display pixel arrays may also be formed (e.g., electronic ink displays, etc.). The use of OLED technology to form flexible display 14 is sometimes described herein as an example. This is, however, merely illustrative. Flexible display 14 may be formed using any suitable flexible display technology. The use of flexible displays that are based on OLED technology is merely illustrative.

Display 14 may have portions that are visible on a front side such as front surface 22 of device 10 and portions that are bent so that they are visible on edges such as sidewall surfaces 24 of device 10. If desired, display 14 may be bent such that portions of display 14 are visible from a back side (e.g., a surface opposing front surface 22) of device 10.

In addition to functional display layers (i.e., the OLED array and the optional touch sensor array), display 14 may include one or more structural layers. For example, display 14 may be covered with a flexible or rigid cover layer and/or may be mounted on a support structure (e.g., a rigid support). Layers of adhesive may be used in attaching flexible display layers to each other and may be used in mounting flexible display layers to rigid and flexible structural layers.

In configurations for display 14 in which the cover layer for display 14 is flexible, input-output components that rely on the presence of flexible layers may be mounted at any suitable location under the display (e.g., along peripheral portions of the display, in a central portion of the display, etc.). In configurations for display 14 in which the flexible layers are covered by a rigid cover glass layer or other rigid cover layer, the rigid layer may be provided with one or more openings and electronic components may be mounted under the openings. For example, a rigid cover layer may have openings for components such as button 17 and speaker component 19 (e.g., for an ear speaker for a user). Device 10 may also have other openings (e.g., openings in display 14 and/or housing 12 for accommodating volume buttons, ringer buttons, sleep buttons, and other buttons, openings for an audio jack, data port connectors, removable media slots, etc.).

Housing 12 may have openings such as openings 18 that allow bent portions of display 14 to be visible through openings 18. In the example of FIG. 1, housing 12 has three openings 18 for portions of display 14 that may be configured to be virtual buttons, virtual switches, scrolling displays, etc. This is merely illustrative. If desired, all of display 14 may be visible through housing 12 (e.g., using a transparent material to form housing 12), housing 12 may have more than three openings, less than three openings, round openings, rectilinear openings, oval shaped or oddly shaped openings, etc. If desired, a transparent cover layer may extend over edges 24 of device 10 forming a continuous display around device 10. Portions of a continuous display around device 10 may be configured to be virtual buttons, virtual switches, scrolling displays, etc. In configurations in which device 10 is provided with a continuous transparent cover layer, portions of display 14 may be separated from other portions of display 14 using a printed or painted mask on an internal surface of the cover layer or may be separated by selectively activating and inactivating display pixels to create virtual borders, virtual sections, or other visual delineations between portions of display 14.

In some embodiments, portions of flexible display 14 such as peripheral regions 20I may be inactive and portions of display 14 such as rectangular central portion 20A (bounded by dashed line 20) may correspond to the active part of display 14. In active display region 20A, an array of image pixels may be used to present text and images to a user of device 10. In active region 20A, display 14 may include touch-sensitive components for input and interaction with a user of device 10. If desired, regions such as regions 20I and 20A in FIG. 1 may both be provided with display pixels (i.e., all or substantially all of the entire front planar surface of a device such as device 10 may be covered with display pixels). Edge portions of display 14 along edges 24 of device 10 may form a part of active regions 20A. Edge portions of display 14 forming part of active region 20A may contain portions of the array of image pixels for presenting to present text and images to a user of device 10 and touch-sensitive components for input and interaction with a user of device 10.

By folding the edges of flexible touch-sensitive display 14 (e.g., a flexible display layer and a flexible touch-sensitive layer), customizable illuminated touch-sensitive regions such as virtual buttons may be displayed along edges 24 of device 10. Providing customizable virtual buttons may reduce system overhead costs and delays associated with creating and assembling individual physical buttons and switches.

Customizable virtual buttons can be repurposed during normal operation of device 10. Graphical and text displays on display 14 may indicate the current purpose and location of a virtual button to a user of device 10. As an example, round virtual buttons indicating a "+" and "−" for raising and lowering audio output volume may be replaced by an image of a camera when a user changes from an audio mode of operation to an image capture mode of operation of device 10. Virtual buttons may include buttons specific to a particular software application installed on device 10. Virtual buttons may include locking and unlocking buttons. Locking and unlocking buttons may be operated using a swipe, pinch, or other touch action by a user of device 10. Virtual buttons may include buttons specific to gaming software installed on device 10. For example, virtual buttons may include buttons on edges 24 that may be operated by a user when holding device 10 in a landscape orientation during operation of device 10 in a gaming mode. Virtual buttons may be operated using touch, tap, swipe, pinch or other touch inputs to virtual buttons. Virtual buttons may include buttons commonly provided on a full sized computer keyboard (e.g., caps lock, shift, control, delete, page up/down, number lock, function specific buttons, escape, enter, etc.). Virtual buttons may include buttons commonly found on a calculator (e.g., multiply, add, divide, subtract, memory storage, clear, all clear, percent, square root, or other calculator buttons). Virtual buttons may include buttons for selecting specific software application available on device 10 (e.g., text messaging, calendar, calculator, media player, web browser, email client, cellular telephone, or other software applications). Virtual buttons may include images or icons that indicate the current function of the virtual button. Virtual buttons may include buttons commonly found on cellular telephone such as a menu button, a ringer on/off switch, a ringer on/off/vibrate switch, a lock/unlock button, a call button, an end-call button, or any other button associate with a cellular telephone.

During normal operation, when virtual buttons are not needed, portions of display 14 that display virtual buttons along edges 24 of device 10 may be reassigned as an additional display for displaying text and image information to a user of device 10 or may be inactivated. Additional edge displays may be used to display scrollable lists such as artist lists, song lists, album lists, playlist lists, video lists, genre lists, webcast lists, audio book lists, or other scrollable lists. User touch input to edge displays may cause information to scroll vertically or horizontally across edge displays. As an example, in a media player mode of operation, a horizontal swipe may cause circuitry associated with device 10 to change an edge display from an artist list to a song list. A vertical swipe may cause circuitry associated with device 10 to scroll through a song list, an artist list, or other list. These examples are merely illustrative. Displays that are visible on edges of device 10 may be used to display any information or to form any virtual button function.

If desired, device 10 may include one or more sensors such as proximity sensor 124 for preventing erroneous inputs to virtual buttons such as virtual buttons 52 on a sidewall of device 10. For example, in some modes of operation for device 10, device 10 may be held in a portrait (e.g., vertical) orientation, while in other modes of operation for device 10, device 10 may be held in a landscape orientation (e.g., a horizontal orientation). Holding device 10 in a portrait or landscape orientation may result in a user's hands covering different portions of device 10. Sensors such as proximity sensor 124 may be used to determine whether a touch input to virtual buttons 52 is an intended touch by a finger or, for example, an unintended touch by the palm of a hand. This is merely illustrative. Other device components such as light sensors, motion sensors (accelerometers), capacitance sensors, etc. may be included and used to determine the orientation of device 10 and the intent of a touch input to virtual buttons 52. Software running on device 10 may be configured to accept input from components such as proximity sensor 124 or other components to determine whether a touch-input to virtual buttons 52 is intended or unintended. Touch-inputs to virtual buttons 52 that are determined to be unintended may be ignored.

Figure 2:
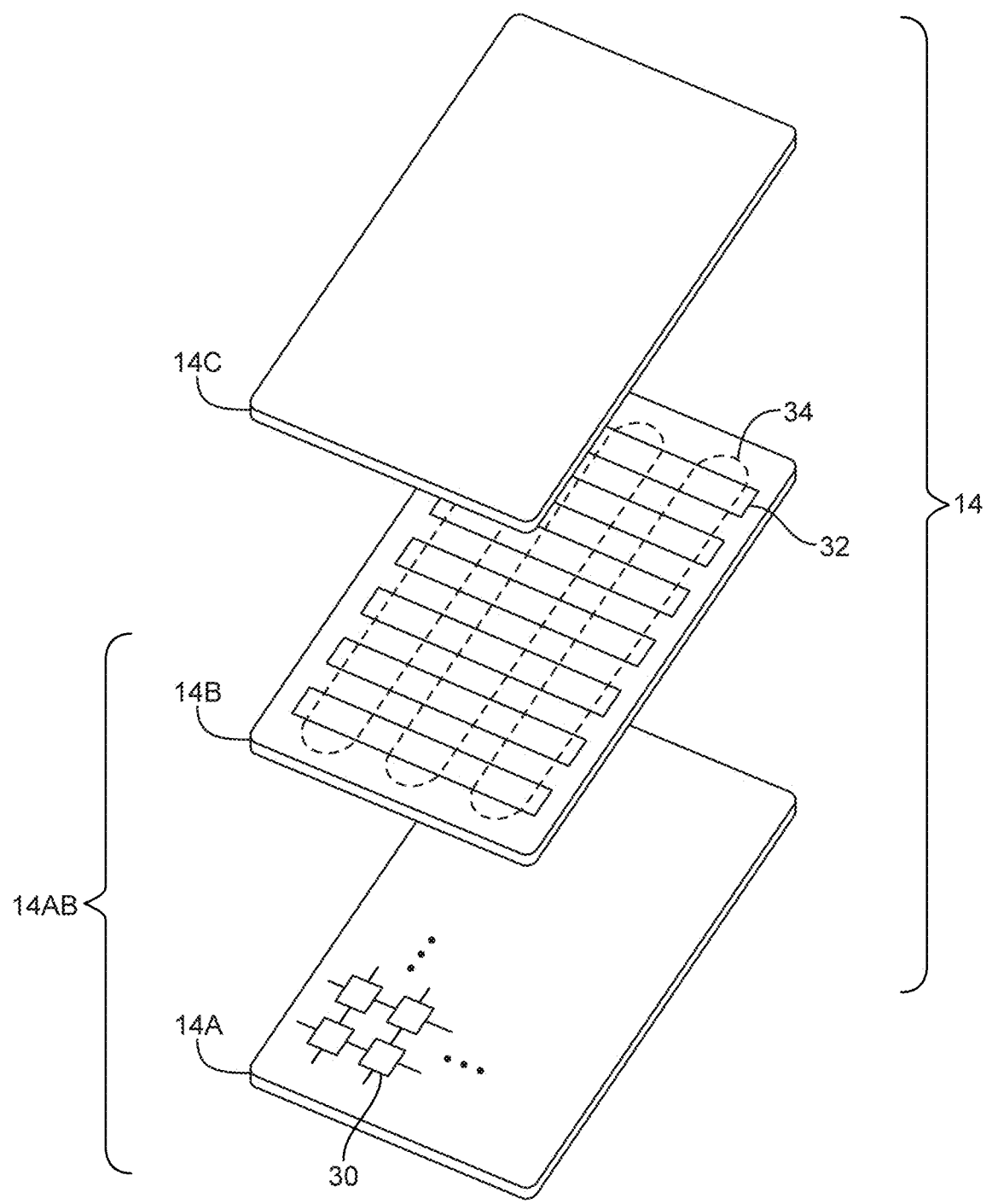
FIG. 2 is a diagram of an illustrative set of display layers that may be used to form a flexible display in accordance with an embodiment of the present invention.

An exploded perspective view of an illustrative display is shown in FIG. 2. As shown in FIG. 2, flexible display 14 may be formed by stacking multiple layers including flexible display layer 14A, touch-sensitive layer 14B, and a transparent display cover layer such as cover layer 14C. Cover layer 14C may form a planar front surface of device 10. Cover layer 14C may have a thickness of, for example, 0.1 mm to 3 mm, 0.1 to 1.5 mm, 0.1 to 2 mm, 1 to 2 mm, 0.7 to 2 mm, more than 0.1 mm or less than 2 mm. Flexible display 14 may also include other layers of material such as adhesive layers, optical films, or other suitable layers. Flexible display layer 14A may include image pixels formed form light-emitting diodes (LEDs), organic LEDS (OLEDs), plasma cells, electronic ink elements, liquid crystal display (LCD) components, or other suitable image pixel structures compatible with flexible displays.

Touch-sensitive layer 14B may incorporate capacitive touch electrodes such as horizontal transparent electrodes 32 and vertical transparent electrodes 34. Touch-sensitive layer 14B may, in general, be configured to detect the location of one or more touches or near touches on touch-sensitive layer 14B based on capacitive, resistive, optical, acoustic, inductive, or mechanical measurements, or any phenomena that can be measured with respect to the occurrences of the one or more touches or near touches in proximity to touch-sensitive layer 14B.

Software and/or hardware may be used to process the measurements of the detected touches to identify and track one or more gestures. A gesture may correspond to stationary or non-stationary, single or multiple, touches or near touches on touch-sensitive layer 14B. A gesture may be performed by moving one or more fingers or other objects in a particular manner on touch-sensitive layer 14B such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Cover layer 14C may be formed from or glass (sometimes referred to as display cover glass) or plastic and may be flexible or rigid. If desired, the interior surface of peripheral inactive portions 20I of cover layer 14C may be provided with an opaque masking layer such as black ink, black plastic film, silver ink, silver plastic film or opaque masking layer of another color.

Touch-sensitive flexible display section 14AB may be formed from display pixel array layer 14A and optional touch sensor layer 14B.

Figure 3:
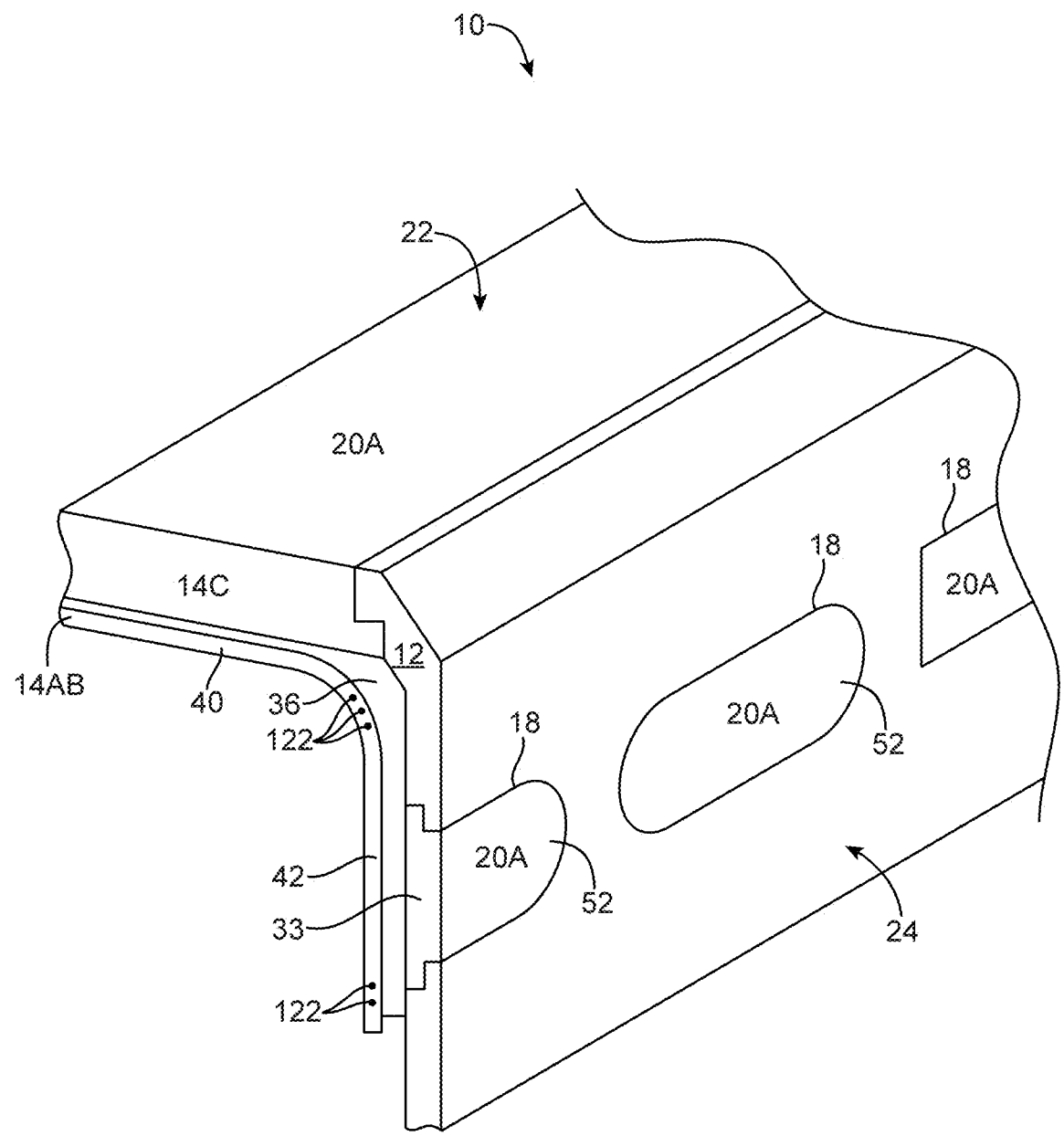
FIG. 3 is a perspective view of a portion of an illustrative electronic device showing touch-sensitive edge displays on an edge of the device formed from a portion of a bent flexible display and a patterned housing member in accordance with an embodiment of the present invention.

FIG. 3 is a perspective view of a portion of device 10 in the vicinity of openings 18 in housing 12. As shown in FIG. 3, cover layer 14C may form a front side 22 of device 10. Cover layer 14C may be mounted to housing 12. Housing 12 may have portions that form a sidewall 24 (also referred to herein as an edge or edge portion, housing sidewall, sidewall surface, etc.) of device 10. Edge portions 24 of device 10 may be substantially planar and may have portions that are substantially perpendicular to cover layer 14C. Portions of housing 12 that form edges 24 of device 10 may be provided with openings such as openings 18. Openings 18 may be partially or substantially filled by a transparent material such as transparent material 33. Transparent material 33 may be formed form plastic, glass or any other suitable transparent material. Transparent material 33 may be flexible or rigid. Transparent material 33 may allow portions of touch-sensitive flexible display section 14AB to be accessible through openings 18 in housing 12. Touch-sensitive flexible display section 14AB may be attached to housing 12 and cover layer 14C using an adhesive layer such as adhesive layer 36. Adhesive layer 36 may be formed from any suitable transparent adhesive. As shown in FIG. 3, portions of display 14 may be visible on top side 22 of device 10 (e.g., a front side display) and portions of display 14 may be visible on edge 24 of device 10 (e.g., an edge display). Portions of display 14 visible on edge 24 of device 10 may be virtual user input-output components such as touch-sensitive edge display portions 52 (also sometimes referred to herein as touch-sensitive edge displays, virtual buttons, virtual interfaces, edge displays, edge interfaces, illuminated touch-sensitive display regions, or virtual switches). If desired, all or substantially all of edge 24 of device 10 may be used as an edge display. If desired control circuitry such as conductive traces 122, may be formed in portions of display 14 that are hidden from view by housing 12. Conductive traces 122 may provide control lines, drive lines, or other electrical connections for display pixels in display 14.

During manufacturing of device 10, display pixels in display 14 that are positioned under openings 18 in housing 12 may be calibrated as button pixels (i.e., pixels that correspond to a virtual button such as virtual button 52). During normal operation of device 10, display pixels calibrated as button pixels may be configured to be illuminated and may be configured to display an image indicating the current function of the indicated pixels. User input (e.g., touch input using a finger) in the vicinity of button pixels of display 14 may activate the virtual button. A user of device 10 may change the function of button pixels by changing the operational mode of device 10. Users may change the operational mode of device 10 using buttons such as button 17 of FIG. 1 or using virtual buttons on front side 22 or edge 24 of device 10. User input that changes the operational mode of device 10 may be touch input (e.g., tapping, swiping, pinching, etc.) to touch-sensitive layer 14B of flexible display 14. Users may change the mode of operation of device 10 together with the display function of edge displays 52 or may change the mode display function of edge displays 52 without changing the mode of operation of device 10. For example, during operation of device 10 in a cellular telephone or audio playback mode, edge displays 52 may function as virtual buttons for changing the volume of the audio output from device 10. If desired, a user may change the display function of edge displays 52 to display the name of a caller or a song name, artist name, album name or other information related to a song, video or other media on device 10. In some configurations, device 10 may be provided with multiple edge displays 52 as shown in FIG. 3. In configurations in which device 10 includes multiple edge displays 52, some edge displays 52 may be configured to operate as virtual buttons while other edge displays 52 are configured to operate as informational or graphical displays.

As shown in FIG. 3, flexible display 14 may be bent so that a portion such as portion 40 is parallel to front side 22 of device 10 and a portion such as portion 42 is parallel to edge 24 of device 10. This is merely illustrative. Portions of flexible display 14 may, if desired, be parallel to any side of device 10 or may have a curved shape that conforms to non-planar portions of housing 12 or cover layer 14C (e.g., convex or concave portions of device 10).

Figure 4:
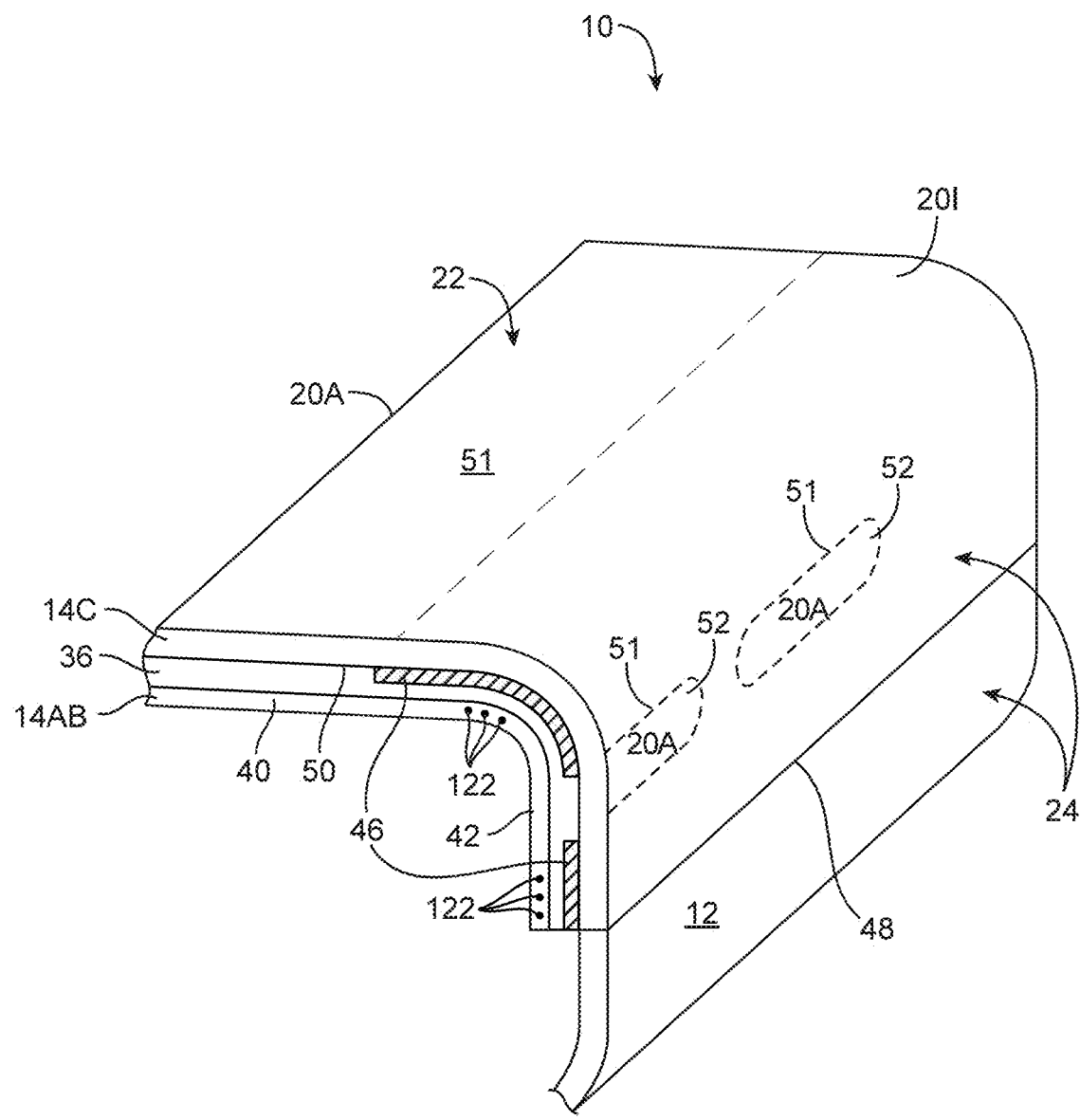
FIG. 4 is a perspective view of a portion of an illustrative electronic device showing touch-sensitive edge displays on an edge of the device formed from a portion of a bent flexible display and an opaque masking layer in accordance with an embodiment of the present invention.

If desired, cover layer 14C may be extended around a corner of device 10 from front side 22 to edge 24 of device 10 as shown in FIG. 4. In the example of FIG. 4, housing 12 and cover layer 14C form an interface 48 on sidewall surface 24 of device 10. Touch-sensitive flexible display section 14AB may be attached to cover layer 14C using an adhesive layer such as adhesive layer 36 interposed between touch-sensitive flexible display section 14AB and cover layer 14C. Portions of an internal surface of cover layer 14C may be patterned with a masking material to form a patterned opaque masking layer such as patterned opaque masking layer 46. Patterned opaque masking layer 46 may be formed from any suitable masking material (e.g., black ink, silver ink, black or silver plastic film, etc.). Patterned opaque masking layer 46 may be painted, printed or otherwise deposited on inner surface 50 of cover layer 14C so that active portions 20A may be delineated from inactive portions 20I of touch-sensitive flexible display section 14AB. As shown in FIG. 4, one or more illuminated touch-sensitive regions (edge displays) 52 may be formed from active regions 20A on edge 24 of device 10. Patterned opaque masking layer 46 may be provided with openings such as openings 51 that define active display regions 20A on front surface 22 and sidewall surface 24 of device 10. Portions of display 14 may be visible through openings 51. Patterned opaque masking layer 46 may have portions interposed between portions of display cover layer 14C on front side 22 of device 10 and flexible display 14. Patterned opaque masking layer 46 may have portions interposed between portions of display cover layer 14C on sidewall surface 24 of device 10 and flexible display 14. Patterned opaque masking layer 46 may have openings 51 under display cover layer 14C on both front side 22 and sidewall surface 24 of device 10. Touch-sensitive flexible display layers 14AB may be visible through openings 51. Display pixels in touch-sensitive flexible display section 14AB in active regions 20A on edge 24 may be pre-calibrated during manufacturing of device 10 as button pixels associated with virtual interfaces 52. Virtual interfaces 52 may be virtual buttons (e.g., for raising or lowering audio volume, for activating an electronic or mechanical camera shutter, for changing operational modes, etc.), may be virtual switches, or may be supplemental displays for displaying text, image, video or other information for users of device 10. Active region 20A on front side 22 of device 10 may form a front surface display portion of display 14 and illuminated touch-sensitive regions 52 on sidewall 24 of device 10 may be formed from a sidewall surface portion of display 14. The front surface display portion may be visually separated from illuminated touch-sensitive regions 52 using patterned opaque masking layer 46. If desired control circuitry such as conductive traces 122, may be formed in portions of display 14 that are hidden from view by patterned opaque masking layer 46. Conductive traces 122 may provide control lines, drive lines, or other electrical connections for display pixels in display 14.

Figure 5:
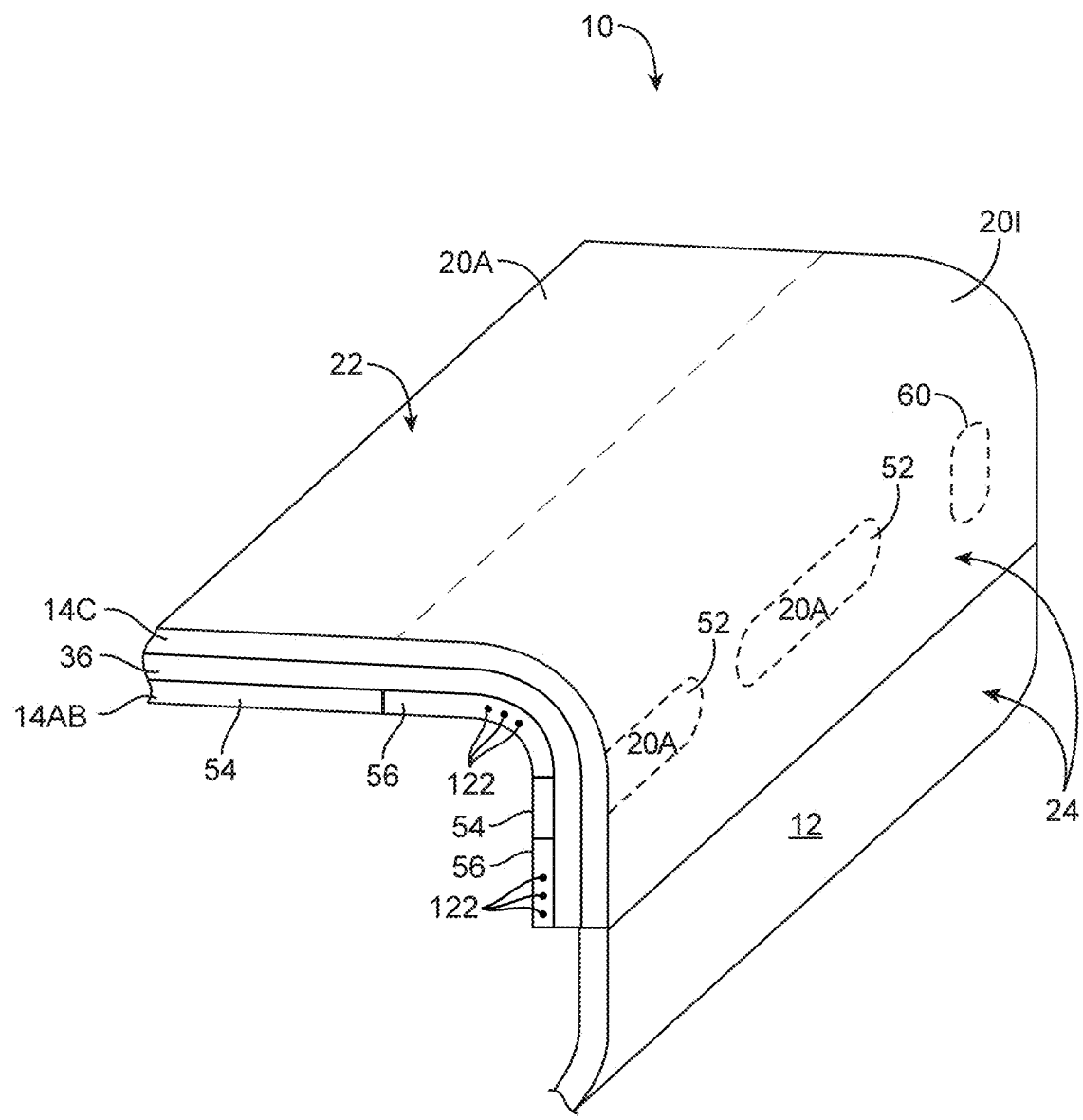
FIG. 5 is a perspective view of a portion of an illustrative electronic device showing touch-sensitive edge displays on an edge of the device formed from a portion of a bent flexible display in accordance with an embodiment of the present invention.

If desired, active portions 20A and inactive portions 20I of display 14 may be defined using active portions 54 and inactive portions 56 of touch-sensitive flexible display section 14AB as shown in FIG. 5. In inactive portions 56 of touch-sensitive flexible display section 14AB, display pixels in display layer 14A and touch-sensitive elements in touch-sensitive layer 14B may be temporarily or permanently disabled. Inactive portions 56 and active portions 54 of touch-sensitive flexible display section 14AB may be configured to create edge displays 52 on edge 24 of device 10. In configurations in which edge displays 52 are created using active portions 54 and inactive portions 56 of touch-sensitive flexible display section 14AB, virtual user interfaces 52 may be repositioned, resized, or otherwise reallocated by changing the distribution of inactive and active display pixels and touch-sensitive elements. As an example, one or more virtual buttons 52 may be moved and resized to position 60 along edge 24 of device 10. Alternatively, an additional virtual button 52 may be added at position 60 on sidewall surface 24 of device 10.

Touch-sensitive flexible display section 14AB may be attached to cover layer 14C using any suitable transparent adhesive 36. Providing device 10 with a flexible display such as flexible display 14 that conforms to inner surface 50 of cover layer 14C may allow substantially all of front side 22 and edge 24 of device 10 to be part of active display area 20A and to be used for display and user interface purposes. Active regions 20A on edge 24 of device 10 may be used as a display that is supplemental to active portions 20A on front side 22 of device 10. Supplemental displays on edge 24 of device 10 may be virtual user interface components, scrolling displays, may display information about media (e.g., songs or movies) currently playing or currently stored on device 10, may display information about current or recent cellular telephone calls, text messages, email updates, webpage updates, etc.

Portions of display 14 may interchangeably be allocated to active regions 20A and inactive regions 20I. Portions of display 14 that form virtual buttons during one mode of operating device 10 may be repurposed to form a portion of an informational display during another mode of operation of device 10. Virtual buttons that are created in a portion of display 14 that is repurposed may be reallocated to another portion of display 14. If desired control circuitry such as conductive traces 122, may be formed in inactive region 20I. Conductive traces 122 may provide control lines, drive lines, or other electrical connections for display pixels in display 14.

Figure 6:
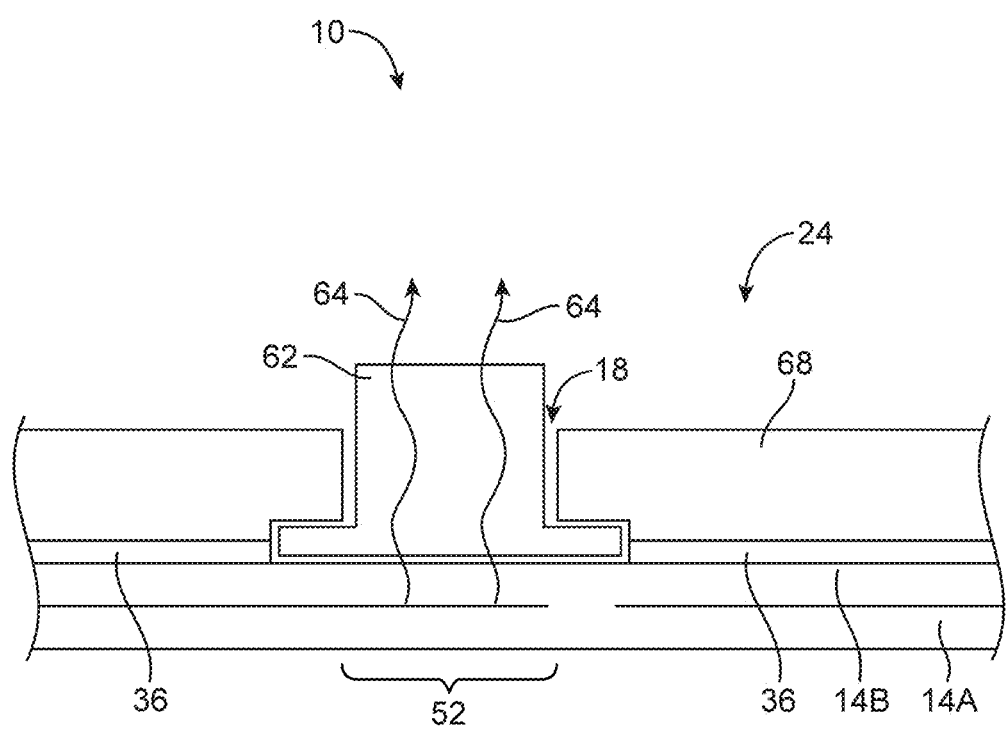
FIG. 6 is a cross-sectional side view of a portion of an illustrative electronic device in the vicinity of a virtual button having a transparent button member in accordance with an embodiment of the present invention.

As shown in FIG. 6, virtual buttons 52 on edge 24 of device 10 may have an associated transparent button member. Virtual buttons 52 formed from active portions of touch-sensitive flexible display section 14AB may be formed in openings such as openings 18 in a structural member such as structural member 68. Structural member 68 may be formed from a portion of housing 12, may be formed from a portion of cover layer 14C or may be formed from another structural member of device 10. A button member such as button member 62 may be mounted in opening 18. Button member 62 may be a dummy button member that serves as a tactile indicator for a user of device 10 indicating the location of virtual button 52. Button member 62 may be formed from a transparent material such as plastic, glass, or other transparent material. Light such as light 64 generated by display pixels in display layer 14A may pass through button member 62 so that virtual button 52 may be visible through button member 62. Providing virtual button 52 with a transparent button member such as button member 62 may provide a user with a tactile button indicator while allowing virtual button 52 to be repurposed for different operating modes of device 10.

Figure 7:
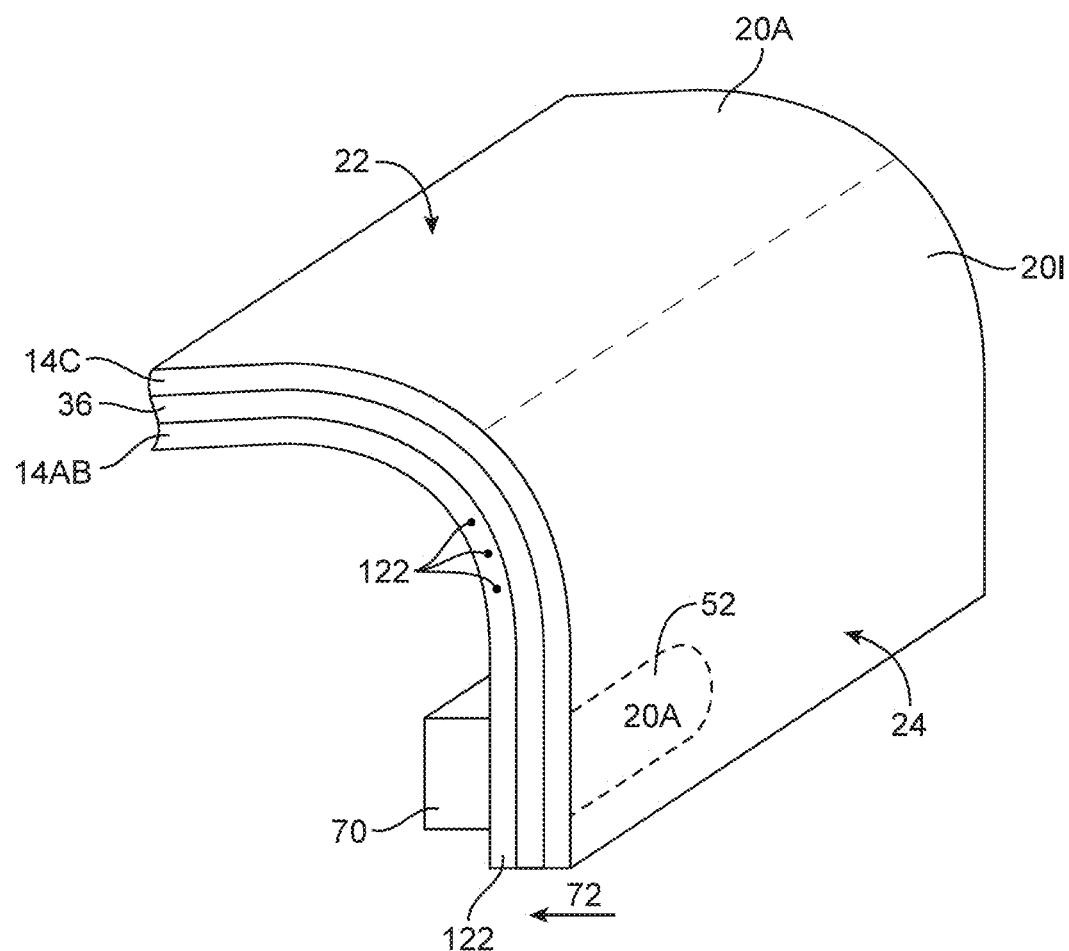
FIG. 7 is a cross-sectional side view of a portion of an illustrative electronic device in the vicinity of a virtual button having an internal component in accordance with an embodiment of the present invention.

As shown in FIG. 7, virtual buttons 52 on edge 24 of device 10 may have an associated feedback element for providing tactile and/or audio feedback to a user of device 10 during activation of virtual buttons such as virtual buttons 52. As shown in FIG. 7, feedback components such as feedback component 70 may be mounted to flexible display 14 in the at the location of one or more of virtual interfaces 52. Feedback component 70 may generate a haptic, audio or other feedback response when virtual button 52 is activated. Virtual button 52 may be activated by a response to a touch or near touch in the vicinity of an active portion of touch-sensitive layer 14B of display 14 associated with virtual button 52. Feedback component 70 may be an actuator such as a motor, solenoid, vibrator, or piezoelectric actuator, an audio component such as a speaker, or other component. In configurations in which cover layer 14C is rigid, feedback component 70 may be an audio feedback component such as a speaker that produces a sound when virtual button 52 is activated. In configurations in which cover layer 14C is flexible, component 70 may contain an actuator such as a piezoelectric actuator 70. Piezoelectric actuators may vary in shape (e.g., thickness) in response to applied control voltages and may produce an output voltage when compressed (i.e., the piezoelectric element in component 70 may serve as a force sensor in addition to serving as a controllable actuator). A user of device 10 may exert force on flexible display 14 in direction 72. If desired, flexible display 14 may be deformed to exert a mechanical pressure on component 70, inducing a voltage which may be transmitted to device 10. Conversely, component 70 may be used to provide tactile feedback to a user of device 10. A voltage difference applied to the surfaces of component 70 may induce an expansion of a piezoelectric actuator. Component 70 may then deform flexible display 14 in a direction outward of device 10 providing tactile feedback to a user of device 10.

Figure 8:
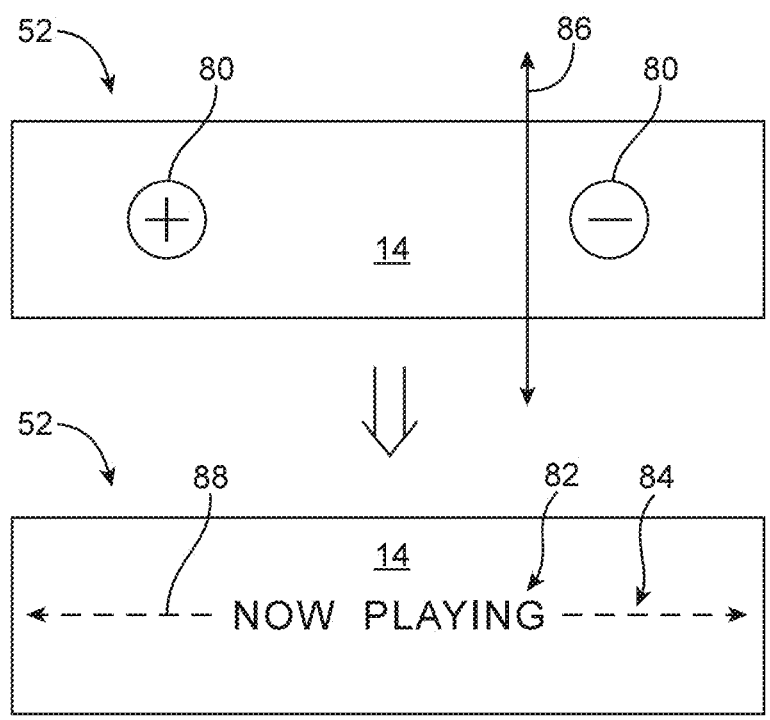
FIG. 8 is a side view of an illustrative edge display portion of a flexible display showing how user input may be used to change the operating mode of an electronic device in accordance with an embodiment of the present invention.

FIG. 8 shows a how portions of an edge display such as edge display 52 may be repurposed from virtual buttons to an informational display. As shown in FIG. 8, in one functional mode, edge display 52 may display virtual button icons such as icons 80. In the example of FIG. 8, icons 80 include a "+" and a "−" symbol surrounded by a circular border. In this example, icons 80 may indicate portions of display 14 that may be touched or tapped in order to raise ("+") or lower ("−") the volume of audio output from device 10. Audio output may be associated with the voice of a caller on a cellular phone, with music or other medial playback from device 10. Audio output may be output from speakers such as speaker 19 (FIG. 1) or from speakers associated with headphones or other remotely connected speakers attached (using wired or wireless connections) to device 10. This is merely illustrative. Virtual button icons 80 may be any suitable icon associated with any operational mode of device 10. As another example, icons 80 may be a camera icon indicating the location of a virtual camera shutter button when device 10 is operated as in a picture capturing mode.

As indicated by arrows 86, a user of device 10 may swipe edge display 52 (e.g., a single swipe in a single direction, multiple swipes in multiple directions, etc.) using a finger. Swiping edge display 52 may change the function of edge display 52. Changing the function of edge display 52 using a swipe of edge display 52 is merely illustrative. The function of edge display 52 may be changed using any suitable touch input to display 14 (e.g., single tap, multiple taps, pinching, circular motions, etc.)

As shown in FIG. 8, swiping edge display 52 may cause virtual buttons 80 to be replaced by an informational display such as informational display 82. In the example of FIG. 8, informational display 82 is a "NOW PLAYING" text display associated with a media file being played back to a user of device 10. This is merely illustrative. Informational display 82 may be any text, image or other graphical display. If desired, informational display 82 may be a flashing display, may appear temporarily and return to a virtual button display, may scroll across edge display 52 in direction 84, direction 88 or in a direction perpendicular to directions 84 and 88.

Figure 9:
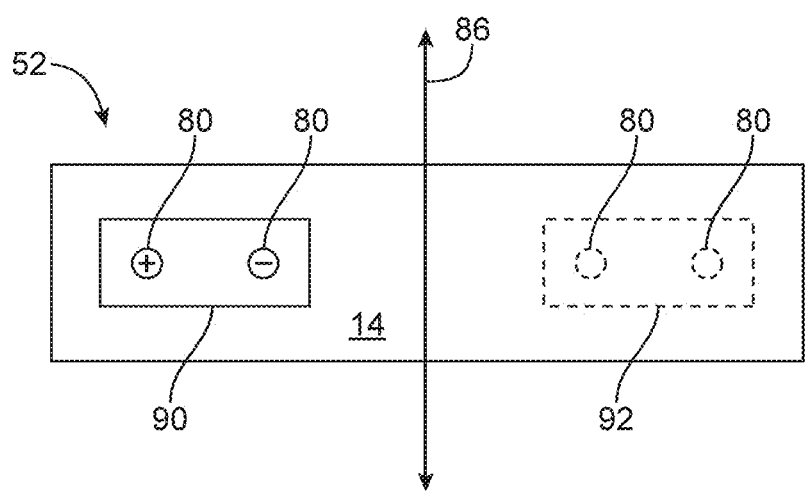
FIG. 9 is a side view of an illustrative edge display portion of a flexible display showing how portions of the edge display may be repurposed based on user input in accordance with an embodiment of the present invention.

If desired, when changing operating modes of device 10 or when changing the function of edge display 52, virtual button icons 80 may be repositioned to another portion of edge display 52 or to another edge display 52 as shown in FIG. 9. In the example of FIG. 9, virtual volume button icons 80 may occupy a first region of edge display 52 such as region 90. When a user changes the function of edge display 52 or changes the mode of operation of device 10 (e.g., by swiping edge display 52 as indicated by arrows 86), region 90 may be repurposed as an informational display or as a virtual button with a different function (e.g., a virtual camera shutter button). When a user changes the function of edge display 52 or changes the mode of operation of device 10, virtual button icons 80 may be moved to a different portion of edge display 52 such as portion 92. Moving icons 80 to portion 92 may allow device 10 to use region 90 for another purpose (e.g., as a camera shutter or informational display) while still providing a user of device 10 with the ability to (for example) change audio output volume.

Figure 10:
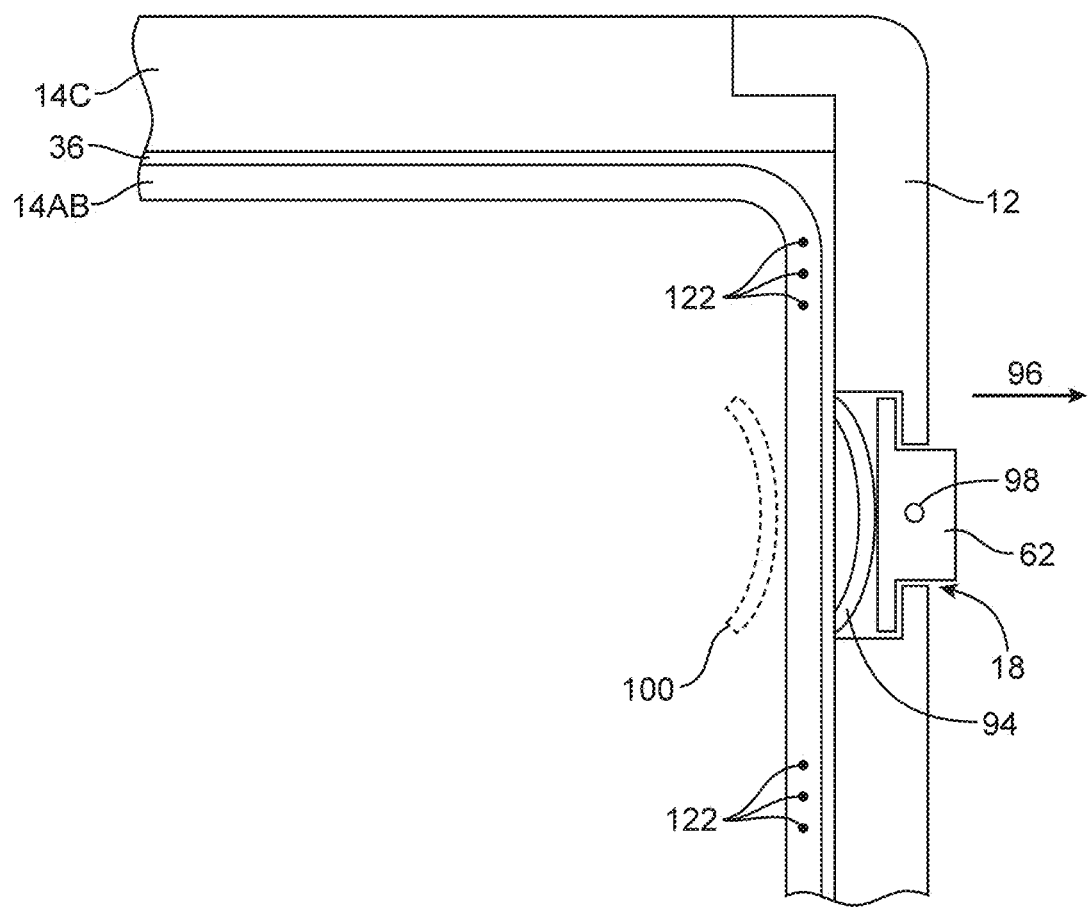
FIG. 10 is a cross-sectional side view of a portion of an illustrative electronic device in the vicinity of a virtual button having a transparent button member and a tactile feedback member in accordance with an embodiment of the present invention.

FIG. 10 is a cross-sectional side view of a portion of device 10 in the vicinity of a virtual button 52 having a biasing member 94. In the example of FIG. 10, biasing member 94 is a dome-shaped biasing member that pushes transparent button member 62 outward in direction 96 when the user releases pressure from button member 62. Other types of biasing members may used if desired, such as spring-based biasing members or other biasing structures that bias button members such as button member 62. The use of a dome-shaped biasing structure is merely illustrative. If desired, transparent button member 62 may include a conductive material such as conductive material 98. Conductive material 98 may form a portion touch-sensitive circuit that detects a touch of button member 62 by a user of device 10. Positioning biasing member 94 between flexible display 14 and button member 62 is merely illustrative. Because display 14 is flexible, biasing member 94 may be placed in a position behind flexible display 14 such as position 100. In configurations in which biasing member 94 is positioned behind flexible display 14, button member 62 may deform flexible display 14 when pushed by a user of device 10. Deforming flexible display 14 with button member 62 may compress biasing member 94. When released, biasing member 94 may push flexible display 14 against transparent button member 62 pushing button member 62 outward in direction 96.

Figure 11:
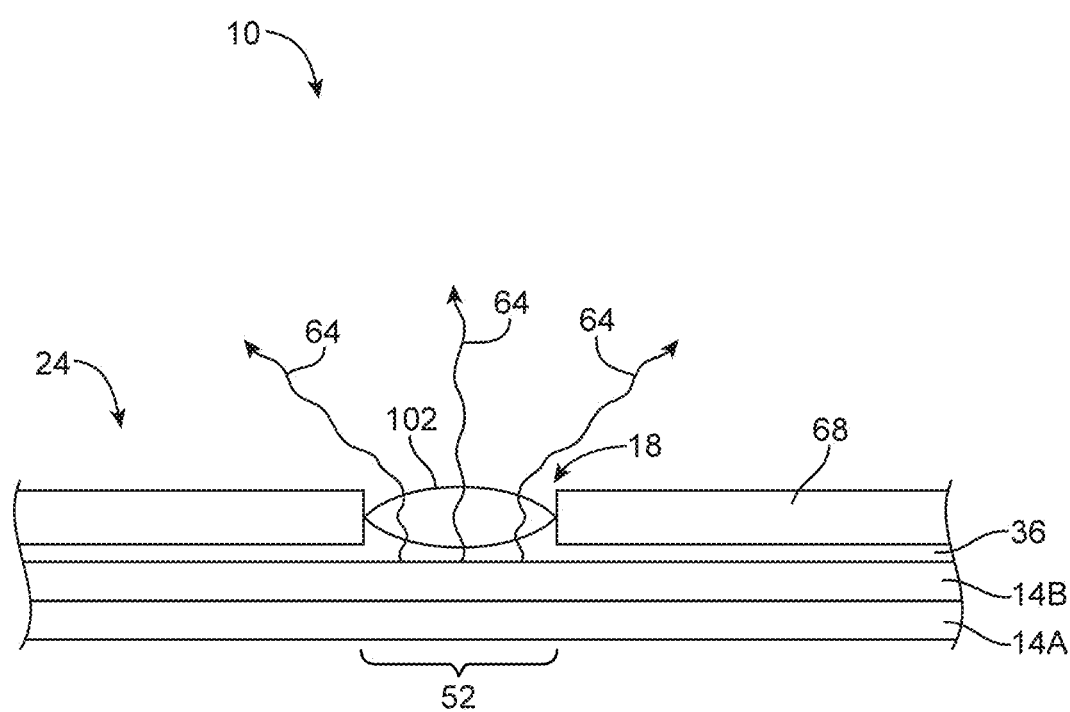
FIG. 11 is a cross-sectional side view of a portion of an illustrative electronic device in the vicinity of a virtual button having an associated lens in accordance with an embodiment of the present invention.

As shown in FIG. 11, touch-sensitive flexible display regions 52 on edge 24 of device 10 may have an associated lens for magnifying or otherwise altering the path of light 64 emitted by display layer 14A of display 14. For example, lens 102 may magnify text or other information displayed on sidewall (edge) display 52). Edge displays 52 formed from active portions of touch-sensitive flexible display section 14AB may be formed in openings such as openings 18 in a structural member such as structural member 68. Structural member 68 may be formed from a portion of housing 12, may be formed from a portion of cover layer 14C or may be formed from another structural member of device 10. A lens such as lens 102 may be mounted in opening 18. Lens 102 may be formed from a transparent material such as plastic, glass, or other transparent material. Light such as light 64 generated by display pixels in display layer 14A may pass through lens 102 so that edge display 52 may be visible through lens 102. Providing edge display 52 with a lens such as lens may provide a brighter edge display, may cause a virtual button to appear larger than its physical size or may otherwise enhance the function of edge display 52.

Figure 12:
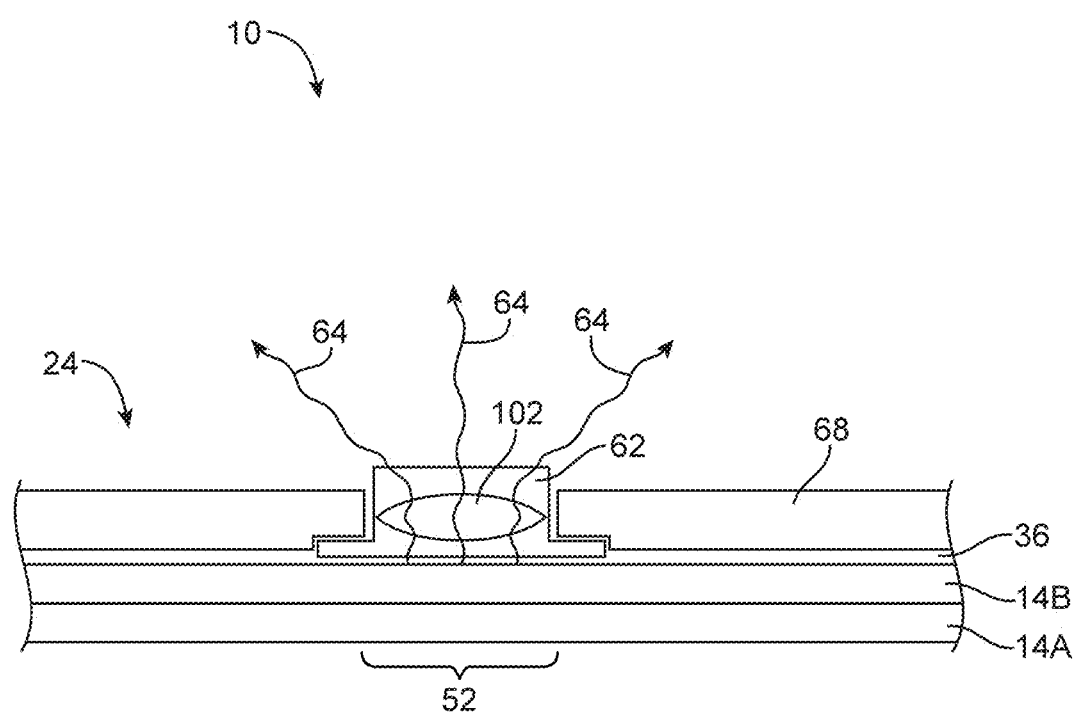
FIG. 12 is a cross-sectional side view of a portion of an illustrative electronic device in the vicinity of a virtual button having a transparent button member with a lens in accordance with an embodiment of the present invention.

If desired, lens 102 may be formed as a portion of a transparent button member such as transparent button member 62, as shown in FIG. 12. Lens 102 may be formed as an integral portion of button member 62 or may be a separate lens member that is mounted to button member 62. Providing device 10 with edge displays 52 that form virtual buttons having transparent button members 62 with lenses 102 may provide a brighter edge display or may cause a virtual button to appear larger than its physical size while providing a tactile indicator to a user of device 10 of the location of virtual button 52.

Figure 13:
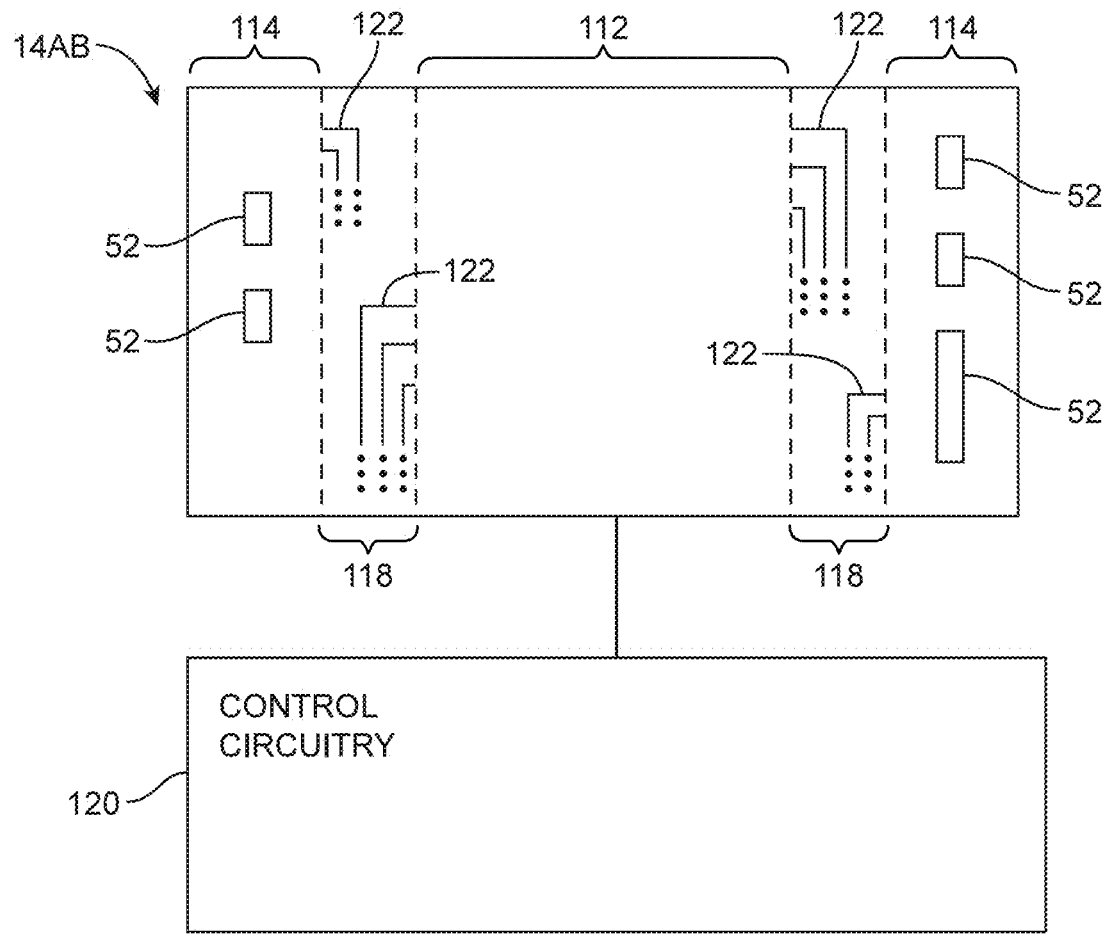
FIG. 13 is a diagram of illustrative control circuitry coupled to a touch-sensitive flexible display having a front surface display portion and a sidewall surface display portion with illuminated touch-sensitive regions in accordance with an embodiment of the present invention.

FIG. 13 shows how touch-sensitive flexible display 14AB may be coupled to control circuitry such as control circuitry 120. Control circuitry 120 may include storage such as flash memory, hard disk drive memory, solid state storage devices, other nonvolatile memory, random-access memory and other volatile memory, etc. Control circuitry 120 may also include processing circuitry. The processing circuitry of control circuitry 120 may include digital signal processors, microcontrollers, application specific integrated circuits, microprocessors, power management unit (PMU) circuits, and processing circuitry that is part of other types of integrated circuits.

Control circuitry 120 may be used to run software on device 10, such as internet browsing applications, voice-over-internet-protocol (VOIP) telephone call applications, email applications, media playback applications, operating system functions, etc. Control circuitry 120 may be used to configure and operate display pixels and touch-sensitive elements associated with touch-sensitive flexible display 14AB. For example, control circuitry 120 may be used to illuminate or inactivate portions of display 14 to create active and inactive regions. As another example, control circuitry 120 may be used to change the operating mode of device 10 and/or the functional mode of edge displays 52 based on touch-input to touch-sensitive flexible display 14AB or other user input. When a user touches virtual button 52, control circuitry 120 can take suitable action. As examples, contact between a user's finger or other external object and virtual button 52 may direct device 10 to take actions such as displaying information for a user, making a volume adjustment to media that is being played to the user, controlling media playback, taking an action associated with a wireless communications session, or otherwise taking suitable action.

One or more virtual buttons such as virtual button 52 may be used to form volume adjustment switches (e.g., sliding controls), ringer buttons, on/off buttons, sleep buttons, customized buttons (e.g., buttons that are specific to a particular program or operating system that is running on device 10 and that change in real time during use of device 10), etc. If desired, virtual buttons may be labeled with particular colors, patterns, icons, text, or other information to assist a user in identifying the function of the button.

Touch-sensitive flexible display 14AB may include front surface display portions 112 and one or more sidewall surface (edge) display portions 114. Sidewall surface display portions 114 may, if desired, be separated from front surface display portion 112 by regions 118. Regions 118 may be blocked from view using masking structures such as portions of a device housing or a patterned opaque masking layer. Regions 118 may be regions of unilluminated (inactive) pixels. Control circuitry 120 may be used to configure touch-sensitive flexible display 14AB to have regions 118 with inactive pixels. As shown in FIG. 13, regions 118 may, if desired, include control circuitry such as conductive traces 122. Conductive traces 122 may be electrically coupled to control circuitry 120. Conductive traces 122 may be control lines for display pixels in regions 112 and 114. Display 14 may have additional control circuitry (e.g., control lines, drive lines, etc.) along a peripheral edge of display 14. Providing display 14 with control circuitry in regions 118 may reduce the area required for control circuitry on the peripheral edge of display 14. Providing display 14 with control circuitry in regions 118 may allow multiple displays (i.e., displays 112 and 114) to be coupled to control circuitry 120 using a common interconnect (e.g., a common flex circuit that interconnects display 14 with control circuitry 120. Connecting multiple displays to control circuitry 120 using a common interconnect may help reduce the space required for interconnects, thereby reducing, for example, the size, production cost and complexity of devices such as device 10.

As shown in FIG. 13, sidewall surface display portions 114 may include illuminated touch-sensitive regions 52. Control circuitry 120 may be used to configure touch-sensitive flexible display 14AB to illuminate pixels in illuminated touch-sensitive regions 52 and to turn off (or inactivate) remaining pixels in sidewall surface display portions 114. Illuminating pixels in illuminated touch-sensitive regions 52 and inactivating other pixels in sidewall surface display portions 114 may separate front surface display portion 112 from illuminated touch-sensitive regions 52. Illuminated touch-sensitive regions 52 may be configured to remain stationary in sidewall surface display portions 114 or may be repositioned in sidewall surface display portions 114 during normal use of device 10 using control circuitry 120. If desired, illuminated touch-sensitive regions 52 may occupy all or substantially all of sidewall surface display portions 114. Virtual buttons 52 may be reconfigured during use of device 10. For example, device 10 may use sidewall region 114 to display a first set of buttons when operated in one mode and may use region 114 to display a second (different) set of buttons when operated in another mode.

Figure 14:
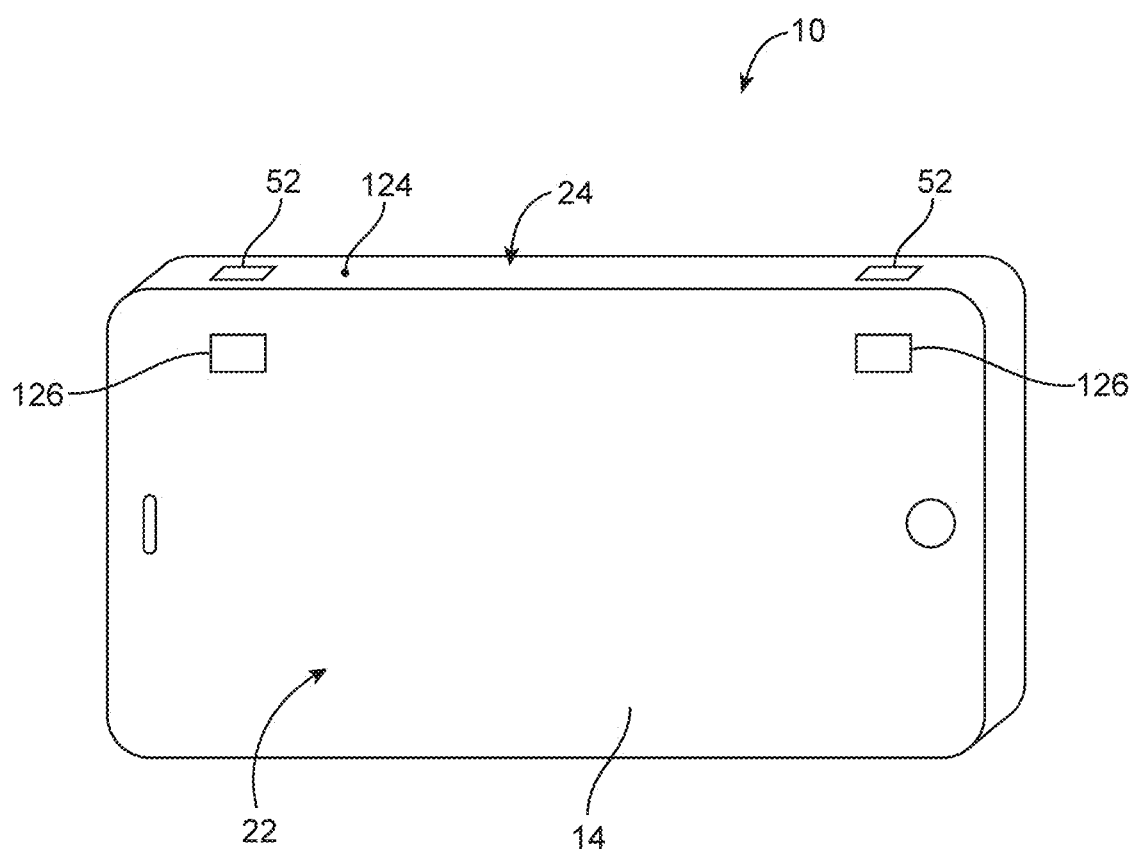
FIG. 14 is a perspective view of an illustrative electronic device showing how virtual sidewall buttons may form a portion of a gaming controller when the device is operated in a landscape position in accordance with an embodiment of the present invention.

FIG. 14 is a perspective view of device 10 showing how virtual buttons 52 may form a portion of a gaming controller when device 10 is operated in a landscape position. As shown in FIG. 14, sidewall surface 24 may include one or more virtual buttons 52. During operation of device 10 in a gaming mode, portions of display 14 that are visible on front surface 22 of device 10 may display additional virtual buttons such as additional virtual buttons 126. Virtual buttons 52, additional virtual buttons 126 and other components of device 10 (e.g., accelerometers) may be used in combination to deliver user input to device 10 for gaming software applications. Virtual buttons 52 may be operated by a touch, swipe, multiple touches or other touch inputs to virtual buttons 52 and 126. Virtual buttons 52 may be used separately (i.e., one at a time) or in combination (e.g., simultaneously) to produce different inputs to device 10. Virtual buttons 126 may be used separately (i.e., one at a time) or in combination (e.g., simultaneously) to produce different inputs to device 10. Virtual buttons 52 and 126 may be used separately (e.g., one at a time, two at a time, etc.) or in combination (e.g., combinations of two virtual buttons, three virtual buttons four virtual buttons, or more than four virtual buttons simultaneously) to produce different inputs to device 10.

In order to prevent erroneous inputs to virtual buttons such as virtual buttons 52 on a sidewall of device 10, device 10 may be provided with one or more sensors such as proximity sensor 124. As an example, while device 10 is in a gaming mode of operation, device 10 may be temporarily held in palm of a user, in a pocket of a user's clothing, may be held in an orientation typically associated with using device 10 during a cellular telephone call, etc. Sensors such as proximity sensor 124 may be used to determine whether a touch input to virtual buttons 52 is an intended touch by a finger or, for example, an unintended touch by the palm of a hand. This is merely illustrative. Control circuitry 120 (see FIG. 13) may be configured to use other device components such as light sensors, motion sensors (accelerometers), capacitance sensors, etc. to determine the orientation of device 10 and the intent of a touch input to virtual buttons 52. Software running on control circuitry 120 may be configured to accept input from components such as proximity sensor 124 or other components to determine whether a touch input to virtual buttons 52 is intended or unintended. Touch inputs to virtual buttons 52 that are determined to be unintended may be ignored.

Figure 15:
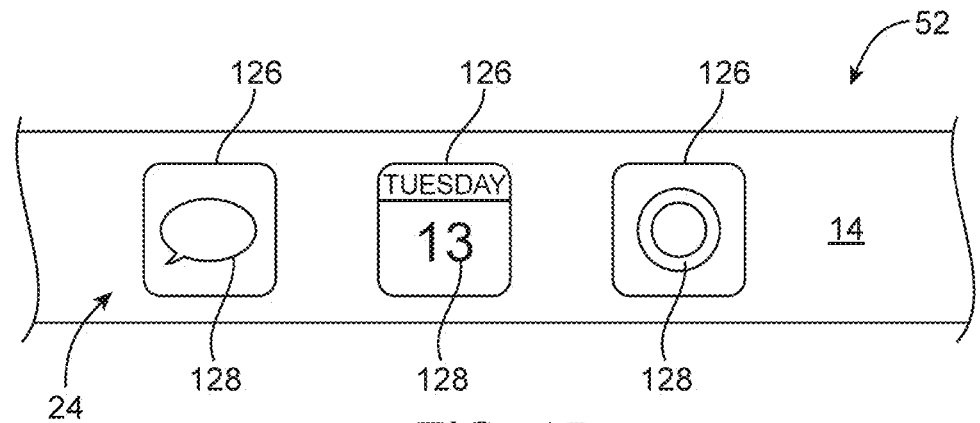
FIG. 15 is a side view of a portion of an illustrative edge display portion of a flexible display showing how user the edge display portion may include virtual buttons for selecting a software application in accordance with an embodiment of the present invention.

FIG. 15 is a side view of a portion of an illuminated touch-sensitive region 52 on a sidewall portion 24 of display 14 showing how illuminated touch-sensitive region 52 may be used to form one or more selection buttons 127 for selecting a software application to be run on device 10 using control circuitry 120. As shown in FIG. 15, selection buttons 127 may include illuminated icons 128 associate with selected software applications such as text messaging, calendar, camera, calculator, media player, web browser, email client, cellular telephone, or other software applications. A selected software application may be activated using a touch input to a portion of illuminated touch-sensitive region 52 associated with a selected selection button 127. As an example, selecting a camera application button may cause selection buttons 127 on illuminated touch-sensitive region 52 to be replaced by function buttons associated with the selected application.

Figure 16:
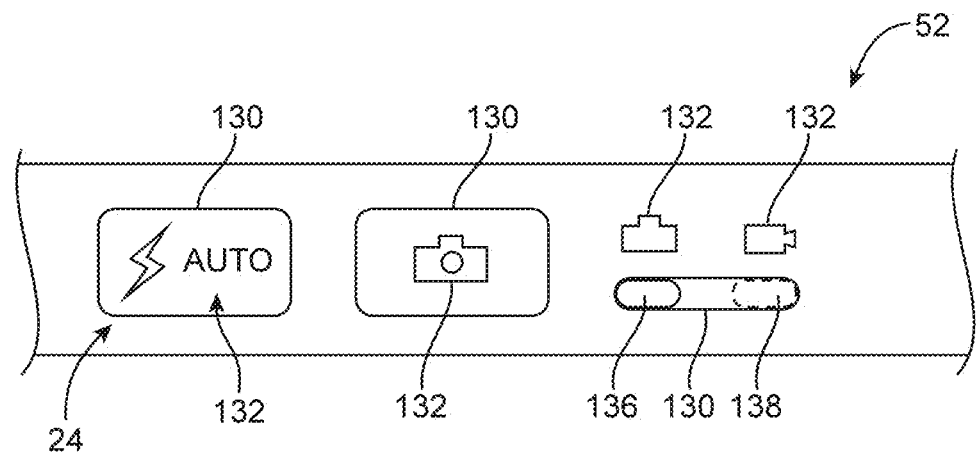
FIG. 16 is a side view of a portion of an illustrative edge display portion of a flexible display showing how user the edge display portion may include virtual buttons specific to a software application in accordance with an embodiment of the present invention.

As shown in FIG. 16, function buttons such as function buttons 130 associated with a selected application may include touch buttons having icons 132 displayed that indicate the function of function button 130 and slider buttons such as slider button 130 that have multiple associated icons 132 that indicate a function associated with multiple positions of slider button 130. In the example of FIG. 16, function buttons 130 include camera function buttons such as a button for turning on, off or setting to automatic setting for a camera flash. Function buttons 130 may include a button with a camera icon 132 indicating a camera shutter button. Function buttons 130 may include a slider switch with a first position 136 for selecting (for example) a snapshot mode and a second position 138 for selecting (for example) a video mode. This is merely illustrative. Slider buttons 130 may have a continuously changing function with the continuously changing position of the slider button (e.g., a continuous zooming control, focus control, light level control, exposure control, etc.).

Figure 17:
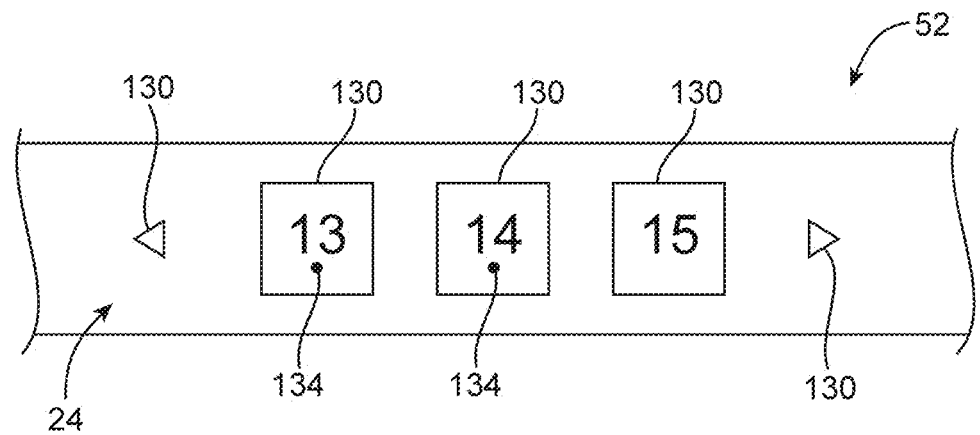
FIG. 17 is a side view of a portion of an illustrative edge display portion of a flexible display showing how user the edge display portion may include virtual buttons specific to a software application in accordance with an embodiment of the present invention.

As shown in FIG. 17, function buttons 130 may display a portion of a calendar. Calendar function buttons 130 may include visible indicators 134 of an appointment associated with a selected, displayed calendar day. Function buttons 130 associated with a calendar application may include arrows for causing edge display 52 to display adjacent calendar days. Illuminated touch-sensitive region 52 may allow scrolling of calendar function buttons vertically or horizontally along illuminated touch-sensitive region 52 in response to a swipe input by a user of device 10 in a vertical or horizontal direction respectively. Some software applications such as media player applications may have associated lists in addition to or instead of function buttons 130.

Figure 18:
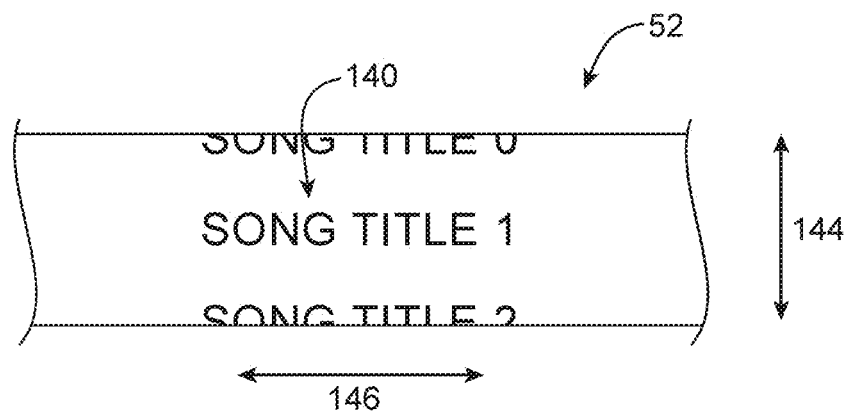
FIG. 18 is a side view of a portion of an illustrative edge display portion of a flexible display showing how user the edge display portion may include a scrollable list that is scrollable in multiple dimensions in accordance with an embodiment of the present invention.

As shown in FIG. 18, illuminated touch-sensitive region 52 may display a list associated with a media player software application for device 10. In the example of FIG. 18, illuminated touch-sensitive region 52 displays a scrollable list of song titles 140. Swiping edge display 52 in a vertical direction (as indicated by arrows 144) may cause edge display 52 to display song titles 140 above or below the currently displayed song title 140 in the list of song titles. Swiping edge display 52 in a horizontal direction (as indicated by arrows 146) may cause edge display 52 to display a different list associated with the same software application such as artist lists, album lists, playlist lists, video lists, genre lists, webcast lists, audio book lists, etc.

Figure 19:
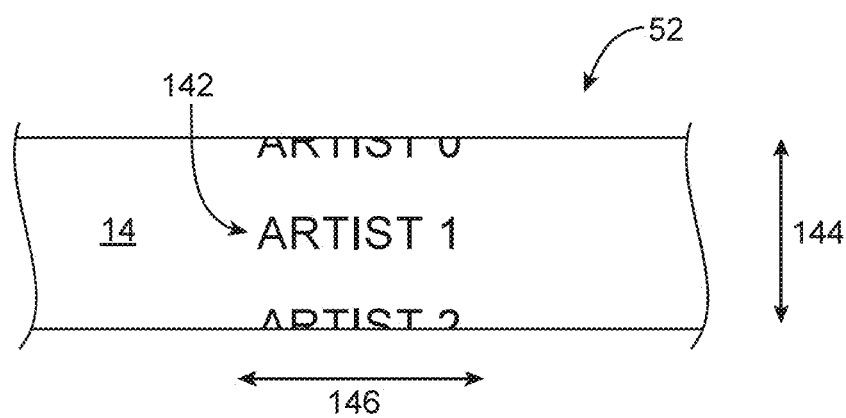
FIG. 19 is a side view of a portion of an illustrative edge display portion of a flexible display showing how user the edge display portion may display a different list based on a user touch-input to the edge display in accordance with an embodiment of the present invention.
Figure 20:
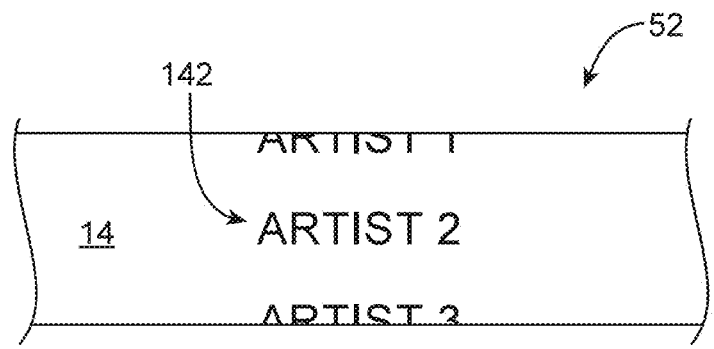
FIG. 20 is a side view of a portion of an illustrative edge display portion of a flexible display showing how user the edge display portion may display a different list entry based on a user touch-input to the edge display in accordance with an embodiment of the present invention.

In the example of FIG. 19, swiping edge display 52 in a horizontal direction (as indicated by arrows 146) may cause edge display 52 to display a list of artists 142 associated with media files stored on circuitry 120 of device 10. After swiping edge display 52 to cause edge display 52 to display a list of artists 142, swiping edge display 52 in a vertical direction (as indicated by arrows 144) may cause edge display 52 to display artist names 142 above or below the currently displayed artist name 142 as shown in FIG. 20. The examples of FIGS. 15, 16, 17, 18, 19, and 20 are merely illustrative. In general, illuminated touch-sensitive regions 52 on a sidewall surface 24 of device 10 may be virtual buttons such as caps lock, shift, control, delete, page up/down, number lock, function-specific buttons, escape, enter, multiply, add, divide, subtract, memory storage, clear, all clear, percent, square root, other calculator buttons, text messaging, calendar, calculator, media player, web browser, email client, cellular telephone, or other software applications, menu, ringer on/off, ringer on/off/vibrate, lock/unlock, call, an end-call, or any other button or other visual information display.

The foregoing is merely illustrative of the principles of this invention and various modifications can be made by those skilled in the art without departing from the scope and spirit of the invention.

What is claimed is:

1. An electronic device, comprising:
   a display having first, second, and third active portions with pixels, wherein the first active portion is configured to form an illuminated touch-sensitive region;
   first and second inactive portions within the display, wherein the first and second inactive portions are interposed between the first and third active portions and wherein some of the pixels in the first active portion are selectively turned off to reposition the illuminated touch-sensitive region; and
   opaque masking material in the first and second inactive portions.

2. The electronic device defined in claim 1 wherein the opaque masking material has an opening.

3. The electronic device defined in claim 2 further comprising a touch sensor that detects touch input on the opening.

4. The electronic device defined in claim 3 further comprising control circuitry configured to launch a camera application in response to the touch input.

5. The electronic device defined in claim 2 further comprising a light-emitting diode that is configured to emit light through the opening.

6. The electronic device defined in claim 2 wherein the opaque masking material has an additional opening.

7. The electronic device defined in claim 6 further comprising a light-emitting diode that is configured to emit light through the additional opening.

8. The electronic device defined in claim 1 wherein the first inactive portion includes unilluminated pixels.

9. The electronic device defined in claim 8 further comprising control circuitry that is configured to selectively activate and inactivate the unilluminated pixels to shift a location of the illuminated touch-sensitive region in the display.

10. The electronic device defined in claim 8 further comprising control circuitry that is configured to selectively activate and inactivate the unilluminated pixels to shift a location of an icon on the display.

11. The electronic device defined in claim 10 wherein the icon is touch-sensitive.

12. The electronic device defined in claim 11 wherein the display is configured to replace the icon with audio playback information.

13. An electronic device, comprising:
    a display having first, second, and third active portions with pixels, wherein the first active portion is configured to form an illuminated touch-sensitive region that displays a first virtual button in a first mode and wherein some of the pixels in the first active portion are selectively turned off to reconfigure the illuminated touch-sensitive region to display a second virtual button in a second mode;
    first and second inactive portions interposed between the first and third active portions; and
    opaque masking material in the first and second inactive portions.

14. The electronic device defined in claim 13 wherein the first virtual button is associated with a first software application and the second virtual button is associated with a second software application that is different from the first software application.

15. The electronic device defined in claim 13 wherein the opaque masking material comprises black ink.

16. The electronic device defined in claim 13 wherein the opaque masking material has an opening aligned with a light-emitting diode.

17. The electronic device defined in claim 13 wherein the first virtual button is associated with a media player application and the second virtual button is associated with a camera application.

18. An electronic device, comprising:
    a display having first, second, and third active areas with pixels, wherein the first active area is configured to form an illuminated touch-sensitive region in a first location in a first mode; and
    first and second inactive areas with opaque masking material interposed between the first and third active areas, wherein the pixels in the first active area that are adjacent to the first inactive area are selectively turned off to reposition the illuminated touch-sensitive region to a second location in a second mode.

19. The electronic device defined in claim 18 wherein the illuminated touch-sensitive region is configured to display a first icon in the first location in the first mode and to display a second icon in the second location in the second mode.

20. The electronic device defined in claim 19 wherein the first icon conveys media playback information and the second icon conveys telephone call information.

* * * * *